(12) United States Patent
Namura et al.

(10) Patent No.: US 8,162,386 B2
(45) Date of Patent: Apr. 24, 2012

(54) CAB FOR CONSTRUCTION MACHINE

(75) Inventors: Akihide Namura, Hirakata (JP);
Hirokazu Sugimoto, Hirakata (JP);
Koudou Tsuji, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/122,624

(22) PCT Filed: Oct. 27, 2009

(86) PCT No.: PCT/JP2009/068401
§ 371 (c)(1),
(2), (4) Date: Apr. 5, 2011

(87) PCT Pub. No.: WO2010/050469
PCT Pub. Date: May 6, 2010

(65) Prior Publication Data
US 2011/0181074 A1 Jul. 28, 2011

(30) Foreign Application Priority Data
Oct. 30, 2008 (JP) .................................. 2008-279412

(51) Int. Cl.
*B60N 99/00* (2006.01)
(52) U.S. Cl. ................. 296/190.11; 296/190.01; 16/366
(58) Field of Classification Search ............. 296/190.01, 296/190.11; 16/366, 376
See application file for complete search history.

(56) References Cited

U.S. PATENT DOCUMENTS

| | | | | |
|---|---|---|---|---|
| 1,268,104 A | * | 6/1918 | Lambert | ........................ 16/366 |
| 4,928,350 A | * | 5/1990 | Morgan | ........................ 16/376 |
| 5,493,760 A | | 2/1996 | Takimoto | |
| 5,659,929 A | * | 8/1997 | Cheng | ............................. 16/366 |
| 2005/0093337 A1 | | 5/2005 | Herrmann et al. | |

FOREIGN PATENT DOCUMENTS

| | | |
|---|---|---|
| JP | 52-103270 U | 8/1977 |
| JP | 52-52133 U | 11/1977 |
| JP | 62-89477 U | 6/1987 |
| JP | 06-14384 U | 2/1994 |
| JP | 07-279525 A | 10/1995 |
| JP | 2618061 B2 | 3/1997 |
| JP | 10-81139 A | 3/1998 |
| JP | 2005-88885 A | 4/2005 |
| JP | 2006-57245 A | 3/2006 |

OTHER PUBLICATIONS

International Search Report of corresponding PCT Application No. PCT/JP2009/068401.

* cited by examiner

*Primary Examiner* — Lori Lyjak
(74) *Attorney, Agent, or Firm* — Global IP Counselors

(57) ABSTRACT

A cab for a construction machine includes hinges that swingably mount the door to the wall. Each of the hinges includes a first member secured to a first cut-out portion of the wall, a second member secured to a second cut-out portion of the door, an interposed member interposed between the first and second members, and first and second pivot shafts pivotally respectively coupling the first and second members to the interposed member. The cab further includes first and second stoppers that regulate first and second angles of the interposed member with respect to the first and second members, respectively, and a bolt member arranged in the second stopper to move in its axial direction to adjust the second angle. An imaginary surface corresponding to an outermost part of each of the hinges is substantially coplanar with exterior surfaces of the wall and the door, when the door is closed.

6 Claims, 20 Drawing Sheets

(a)

(b)

(a)

(b)

(a)

(b)

(a)

(b)

CAB FOR CONSTRUCTION MACHINE

CROSS-REFERENCE TO RELATED APPLICATIONS

This national phase application claims priority to Japanese Patent Application No. 2008-279412 filed on Oct. 30, 2008. The entire disclosure of Japanese Patent Application No. 2008-279412 is hereby incorporated herein by reference.

TECHNICAL FIELD

The present invention relates to a cab for a construction machine that includes hinges for mounting a door to a wall so that the door can be opened 180 degrees.

BACKGROUND ART

In construction machines such as hydraulic excavator, a work is occasionally conducted with the door is fully opened 180 degrees. For this reason, it is necessary that the door in construction machines be constructed to swing 180 degrees. However, in the case where single-shaft hinges are used to allow the door to swing 180 degrees, the pivot shafts of the hinges protrude from the surface of the door or a wall (see Japanese Patent Laid-Open Publication No. 2006-57245).

On the other hand, Japanese Patent Laid-Open Publication No. 2005-88885 discloses construction in that the double-shaft hinges are arranged on the rear end part of a truss structure barrier (the thickness-directional part of the barrier) so that the barrier can swing.

SUMMARY

However, from viewpoint measures against transportation regulation and outward appearance, it is not preferable that the pivot shaft of the hinge protrude from the surface of the door or the wall. Accordingly, it is desired to avoid that such a protruding part be formed.

Although the double-shaft hinge can be easily attached onto the barrier that has the flat part arranged on its rear end part in Japanese Patent Laid-Open Publication No. 2005-88885, if the construction of Japanese Patent Laid-Open Publication No. 2005-88885 is applied to a cab for a construction machine, the door of the cab is required to have an enough thickness that can provide such a flat part onto which the double-shaft hinge is attached. However, if the thickness of the door is large, when the door swings 180 degrees to be opened, the gap between the door and the wall will be small. In addition, in order to comply with transportation regulation, the entire width of a machine is necessarily regulated. For this reason, such a large thickness of the door requires space on the room side, and will reduce operator's room space.

It is an object of the present invention to provide a cab for a construction machine that includes double-shaft hinges for allowing a door to open 180 degrees but does not protrude from the outside surface of the cab when the door is fully closed whereby having a good outward appearance and being compilable with transportation regulation.

A cab for a construction machine according to a first aspect of the present invention includes hinges, a wall and a door. The wall surrounds an operator's seat. An operator can step into/off the cab though the door. The door is swingably mounted to the wall portion by the hinges. Each of the hinges includes first and second members, an interposed member, and first and second pivot shafts. The hinges are attached at positions that are spaced at predetermined distances away from the upper and lower ends of the door. The first member is secured to the wall. The second member is secured to the door. The interposed member is interposed between the first and second members. The first pivot shaft pivotally couples the first member and the interposed member to each other. The second pivot shaft pivotally couples the second member and the interposed member to each other. A first cut-out portion is formed on the outer side surface of the wall. The first member is secured to the first cut-out portion. A second cut-out portion is formed on the outer side surface of the door. The second member is secured to the second cut-out portion. An imaginary surface corresponding to an outermost part of the hinge is substantially coplanar with the exterior surfaces of the wall and the door, when the door is closed.

According to the cab for a construction machine, the cut-out portions are arranged in the outer side surfaces of the door and the side wall of the cab. The double-shaft hinges are attached to eliminate or minimize the protrusion of the attachment members of the hinges from the exterior surface of the cab.

According to this construction, when the door opens/closes the wall, the interposed member pivots with respect to the first member, and the second member additionally pivots with respect to the interposed member. In addition, the first and second members can be fastened to the first and second cut-out portion, which are formed on the wall and the door, respectively. Thus, it is possible to avoid that the hinges protrude from the cab outer peripheral surface. As a result, it is possible to avoid that the hinge structure causes problems that the cab does not meet transportation regulation and the like. In addition, it is possible to improve the outward appearance of the cab.

In a cab structure for a construction machine according to a second aspect of the present invention in the cab structure for a construction machine according to the first aspect of the present invention, the first pivot shaft is arranged so that the distance between the attachment surface of the first member and the outer peripheral surface of the first pivot shaft substantially agrees with the depth of the first cut-out portion. The second pivot shaft is arranged in proximity to the end surface of the door.

According to this construction, the hinges can be attached to eliminate or minimize the protrusion of the outer peripheral surface of the first pivot shaft from the exterior surface of the wall when the door is closed.

In a cab structure for a construction machine according to a third aspect of the present invention in the cab structure for a construction machine according to the first or second aspect of the present invention, the cab further includes a first stopper that limits the pivot angle of the interposed member to a first angle with respect to the first member, and a second stopper that limits the pivot angle of the interposed member to a second angle with respect to the second member.

In this construction, the relative pivot angle of the interposed member with respect to the first member is regulated by the first stopper, while the relative pivot angle of the second member with respect to the interposed member is regulated by the second stopper.

According to this construction, since the door can be positioned with respect to the wall, the door can be reliably mounted to the wall without adjusting the position of a striker with respect to a lock plate on the wall side when the striker is used to fasten the door to the wall with the door being fully opened.

In a cab structure for a construction machine according to a fourth aspect of the present invention in the cab structure for a construction machine according to the third aspect of the present invention, the width of the coupling part of the interposed member agrees with the width of the gap between the door and the wall when the door is fully opened.

According to this construction, since the width of the coupling part of the interposed member is thus specified, it is possible to surely provide an appropriately large gap between the door and wall when the door is fully opened. Therefore, it is possible to prevent that operator's fingers or the like may be caught in the gap.

In a cab structure for a construction machine according to a fifth aspect of the present invention in the cab structure for a construction machine according to the fourth aspect of the present invention, the width of the interposed member falls within the range of 10 to 40 mm.

According to this construction, the width of the gap between the door and the wall when the door is fully opened can be set at an appropriate amount so that operator's fingers may not be caught in the gap, and the hinge does not protrude at a large protrusion amount from the cab side surface.

In a cab structure for a construction machine according to a sixth aspect of the present invention in the cab structure for a construction machine according to the third aspect of the present invention, the first angle is 90 degrees, and the second angle is 90 degrees.

According to this cab for a construction machine, when the interposed member pivots 90 degrees with respect to the first member, and the second member pivots 90 degrees with respect to the interposed member, the door pivots about 180 degrees with respect to the wall so that the door can be fully opened.

In a cab structure for a construction machine according to a seventh aspect of the present invention in the cab structure for a construction machine according to the first or second aspect of the present invention, the first pivot shaft is arranged at the position corresponding to the width of the interposed member from the end of the wall, while the second pivot shaft is arranged on the end of the door.

According to this construction, since the second pivot shaft is arranged on the end of the door, the end of the door does not protrude in the doorway of the cab and does not reduce the width of the opening of the cab when the door is fully opened. Since the first pivot shaft is arranged at the position corresponding to the width of the interposed member from the end of the wall, even if the width of the interposed member is substantially reduced, an unnecessary clearance is not produced between the door and the wall.

BRIEF DESCRIPTION OF DRAWINGS

FIG. 5(a) shows the hinge structure with the door being closed. FIG. 5(b) shows the hinge structure with the door being opened 180 degrees.

FIG. 6(a) shows the hinge structure with the door being closed. FIG. 6(b) shows the hinge structure with the door being opened 180 degrees.

FIG. 7(a) shows the hinge structure with the door being closed. FIG. 7(b) shows the hinge structure with the door being opened 180 degrees.

FIG. 8(a) shows the hinge structure with the door being closed. FIG. 8(b) shows the hinge structure with the door being opened 180 degrees.

DESCRIPTION OF EMBODIMENTS

First Embodiment

Figure 1:
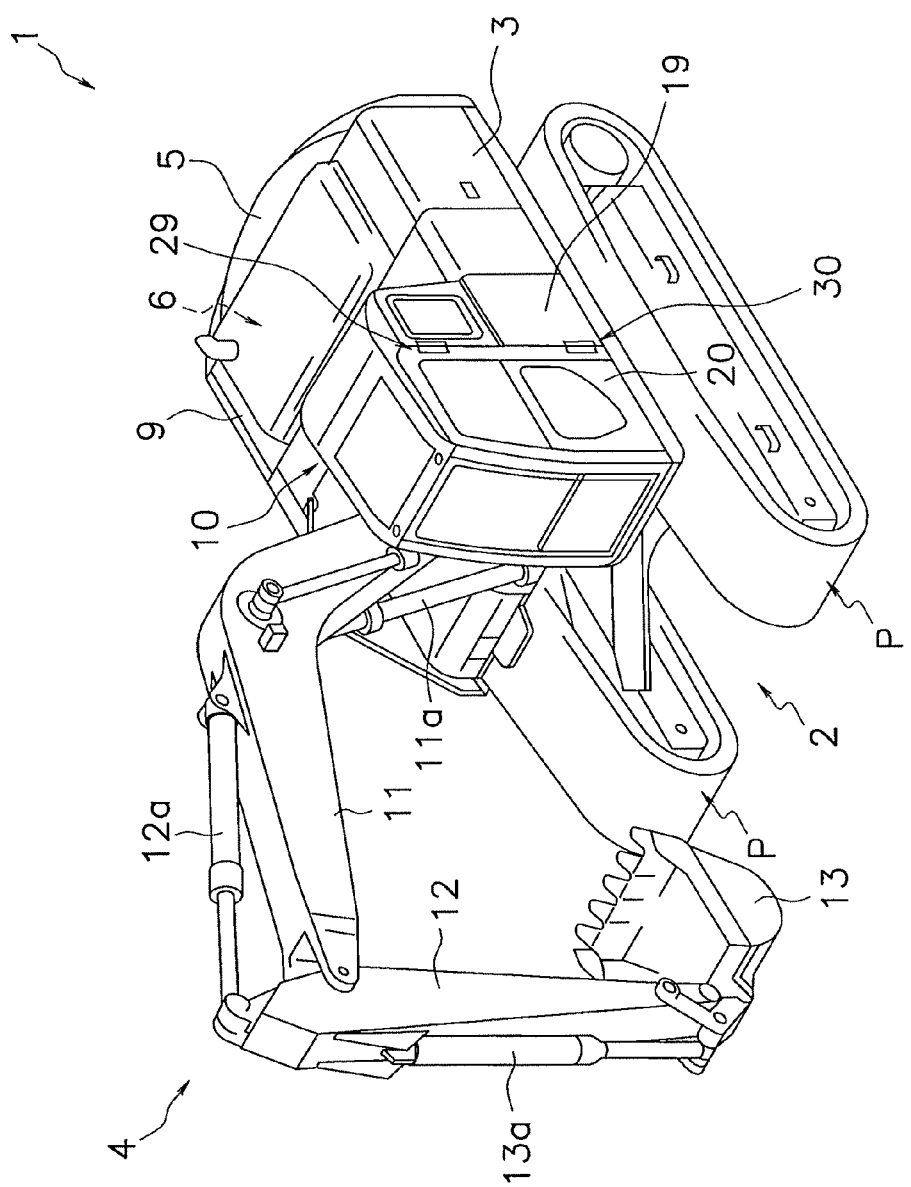
FIG. 1 is a perspective view showing the entire appearance of a hydraulic excavator, which includes a cab according to an embodiment of the present invention.

With reference to FIG. 1, the following description will describe a hydraulic excavator 1 that includes a cab for a construction machine to which a hinge structure according to one embodiment of the present invention is adopted.

Overall Construction of Hydraulic Excavator 1

The hydraulic excavator 1 according to this embodiment includes a lower traveling unit 2, a revolving base 3, a working unit 4, a counterweight 5, an engine room 6, an equipment compartment 9, and a cab 10, as shown in FIG. 1.

The lower traveling unit 2 drives crawler belts P that are wounded on the left and right sides of the lower traveling unit 2 relative to the advance direction so that the hydraulic excavator 1 travels frontward and rearward. The revolving base 3 is revolvably mounted on the upper part of the lower traveling unit 2.

The revolving base 3 can revolve in either direction on the lower traveling unit 2. The working unit 4, the counterweight 5, the engine 6, and the cab 10 are mounted on the upper part of the revolving base 3.

The working unit 4 is constructed to include a boom 11, an arm 12 that is mounted to the end of the boom 11, and a bucket 13 that is mounted to the end of the arm 12. Work is conducted in the field of earthmoving operations for excavation of earth, stone and so on by the working unit 4. In this work, the boom 11, the arm 12, bucket 13 and the like are moved upward and downward by hydraulic cylinders 11a, 12a and 13a, which are included in a hydraulic circuit (not shown).

The counterweight 5 is composed of scrap iron, concrete and the like that are fixed in a box composed of steel plates, for example, and is arranged behind the engine room 6 on the revolving base 3 to keep the balance of a machine body in excavation operations or the like.

The engine room 6 is arranged adjacent to the counterweight 5 on a main frame (not shown) in the rear end part of the revolving base 3. Also, the engine room 6 has accommodation space that accommodates engine, and the like. Thus, the engine, an after cooler, and the like are accommodated in the accommodation space of the engine room 6. The engine serves as a power source for driving the lower traveling unit 2 and the working unit 4.

The equipment compartment 9 is arranged behind the working unit 4, and accommodates a fuel tank, a hydraulic oil tank, operation valves and the like (not shown).

The cab 10 is an operator compartment of the hydraulic excavator 1 where the operator steps into/off, and is arranged in the front left side part of the revolving base 3 on the side of the working unit 4 to provide a clear sight line to the fore end of the working unit 4 for the operator. Also, as shown in FIG. 1, the swingable stepping-into/off door 20 is mounted to the left side surface of the cab 10 by hinges 29 and 30.

The hinges 29 and 30 are attached to recessed parts that are formed in upper and lower parts of a coupling portion between the stepping-into/off door 20 and a side wall 19 of the cab 10. Also, the stepping-into/off door 20 arranged in the left side surface of the cab 10 is held opened 180 degrees from the closed position by the engaging mechanism 26 (discussed later). According to this construction, the operator in the cab 10 can operate the hydraulic excavator 1, with the stepping-into/off door 20 being opened 180 degrees from the closed position.

Construction of Hinge 29, 30

(a) General Construction

In this embodiment, the stepping-into/off door 20 for allowing the operator to step in/off the cab 10 is swingably mounted to the side surface of the cab 10 by the hinges 29 and 30. The hinges 29 and 30 are attached to the cut-out portions, which are foamed at the positions spaced inward away at predetermined distance from the upper and lower ends of the coupling portion between the stepping-into/off door 20 and the side wall 19 of the cab 10. In this embodiment, the edges of the sides of the door 20 and the side wall 19 that are closest to each other refer to edges 20a and 19a of both the members.

The following description will illustratively describe the hinge 29, which is attached to the upper part, among the hinges 29 and 30. The same goes for the hinge 30, which is attached to the lower part, as fundamental construction. In the following description, the front side refers to the left side in FIG. 1, while the back side refers to the right side in FIG. 1.

Figure 2:
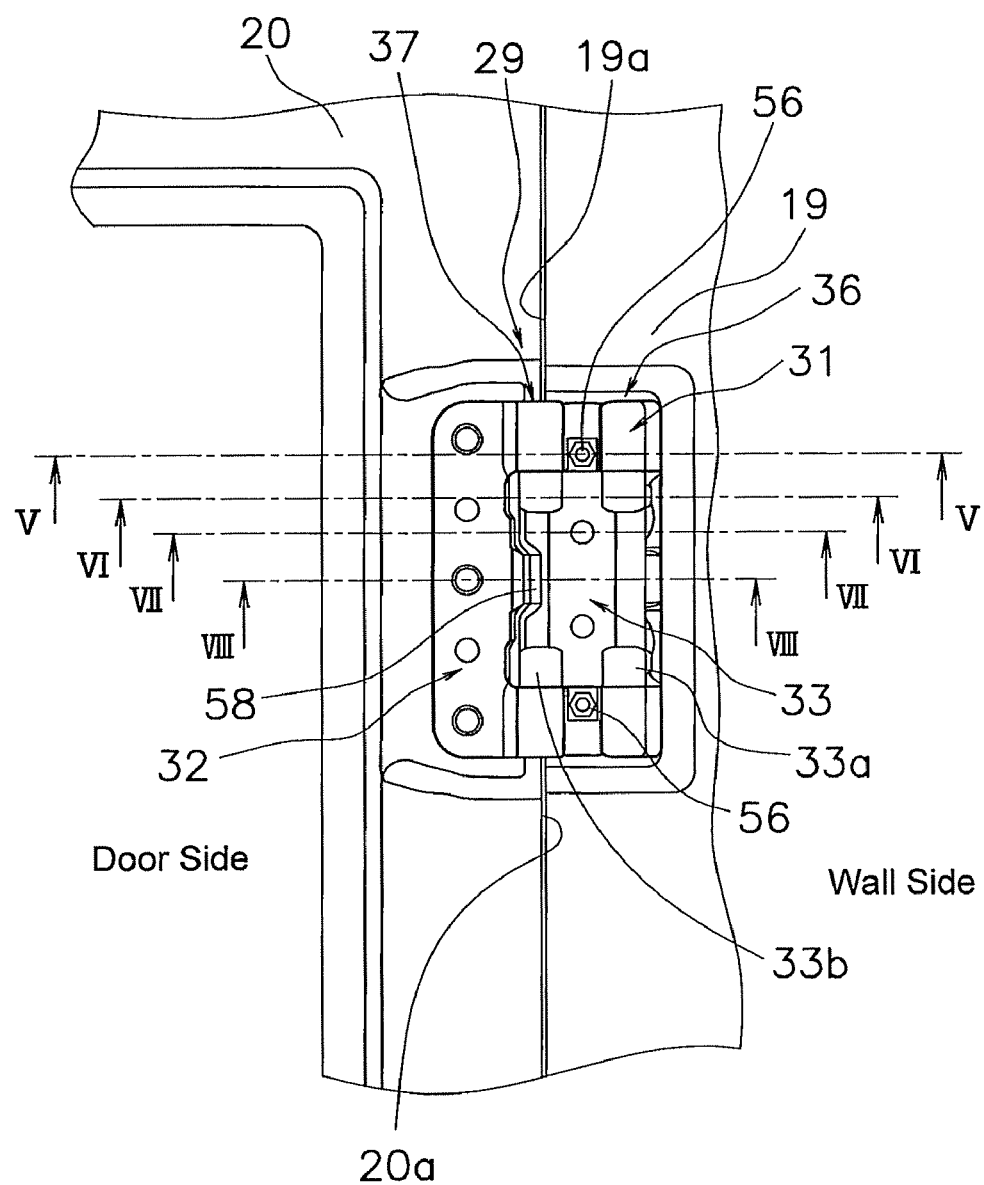
FIG. 2 is a side view showing a hinge structure according to an embodiment of the present invention.
Figure 3:
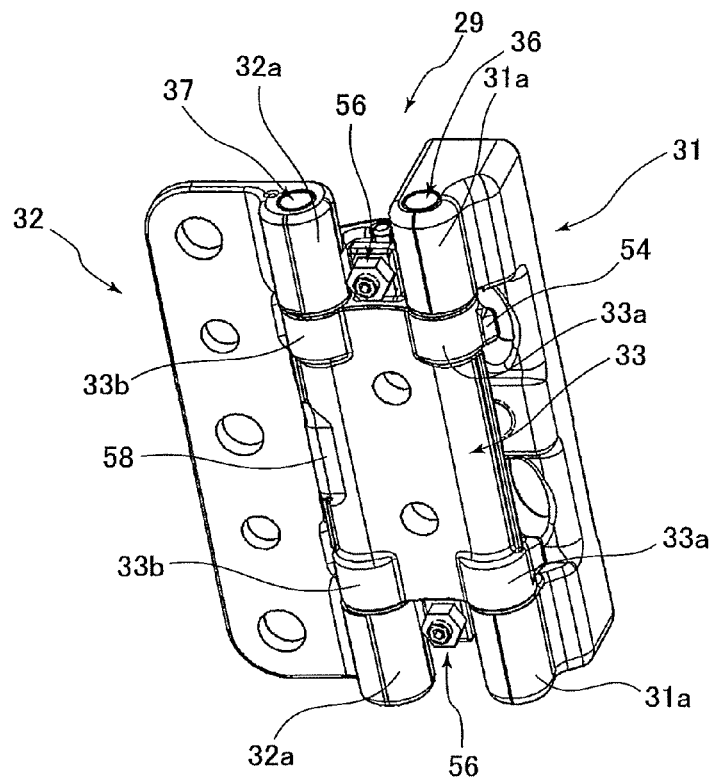
FIG. 3 is a perspective view showing the hinge structure as viewed from the exterior side.
Figure 4:
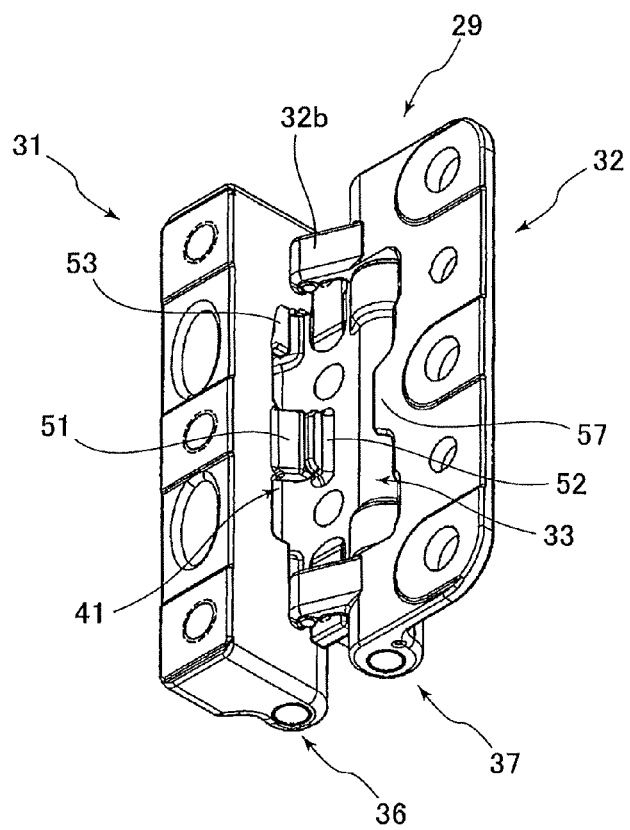
FIG. 4 is a perspective view showing the hinge structure as viewed from the back side.
Figure 5:
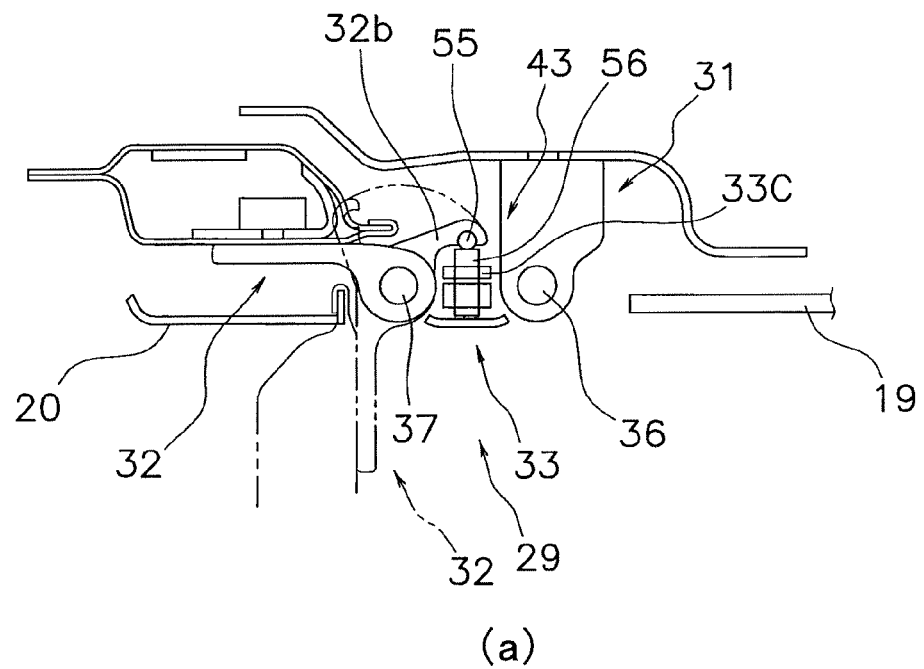
FIG. 5 includes cross-sectional views showing the hinge structure shown in FIG. 2 taken along the line V-V.
Figure 5:
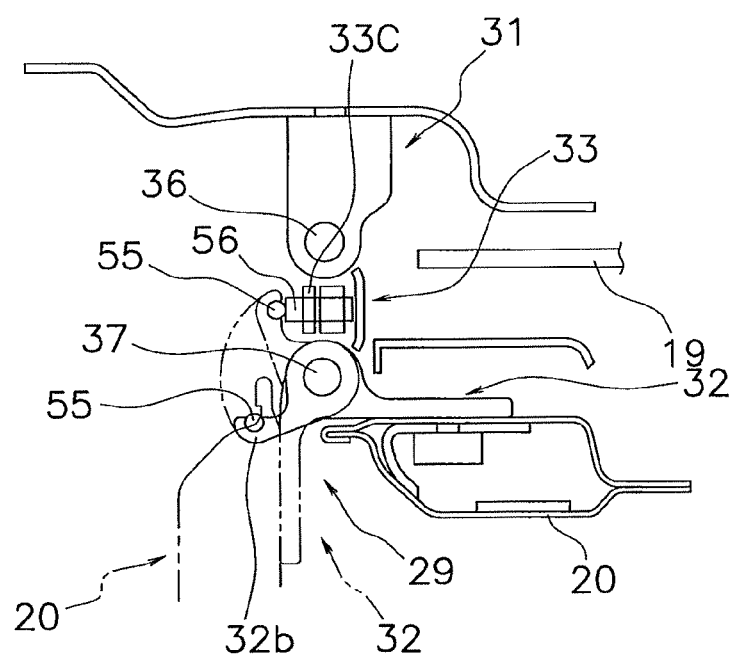

As shown in FIGS. 2 to 4, the hinge 29 is arranged to couple the ends 20a and 19a of the stepping-into/off door 20 and the side wall 19 of the cab 10 to each other. The hinge 29 mainly includes a first member 31, a second member 32, and an interposed member 33. The hinge 29 is a double-shaft hinge that has two pivot shafts 36 and 37. FIGS. 2 to 4 show the hinge 29 with the door 20 being closed.

The first member 31 is secured to the side wall 19. As clearly shown in these Figures, the first member 31 has an elongated shape extending in the vertical direction. The first member 31 includes first support portions 31a on the upper and lower sides that pivotally support the first pivot shaft 36.

The second member 32 is secured to the door 20. As shown in these Figures, the second member 32 is a roughly plate-shaped member that extends in the vertical direction. The second member 32 includes second support portions 32a on the upper and lower sides that pivotally support the second pivot shaft 37.

The interposed member 33 includes a main part having a roughly rectangular shape. The interposed member 33 includes shaft tubes 33a, and the shaft tubes 33b. A core shaft, which composes the first pivot shaft 36, is inserted into the shaft tubes 33a. A core shaft, which composes the second pivot shaft 37, is inserted into the shaft tubes 33b. The shaft tubes 33a are arranged on the back side of the main part. The shaft tubes 33b are arranged on the front side of the main part. The first pivot shaft 36 and the second pivot shaft 37 extend in the vertical direction.

The interposed member 33 and the second member 32 are orientated substantially in parallel to each other frontward of the first member 31 when the door 20 is closed. In this closed state, the interposed member 33 is arranged along the outer surfaces of the stepping-into/off door 20 and the side wall 19, as shown in FIGS. 5(a), 6(a), 7(a) and 8(a). As clearly shown in these Figures, an imaginary surface corresponding to an outermost part of the hinge 29 (i.e., an outermost surface of the interposed member 33) is substantially coplanar with the surface of the door 20.

As shown in FIGS. 2 to 4, the second pivot shaft 37 is arranged in the end 20a of the door 20, while the first pivot shaft 36 is arranged at the position spaced away from the end 20a at a predetermined distance corresponding to the width of the interposed member 33.

In this embodiment, the shaft interference of the first pivot shaft 36 is specified smaller than the second pivot shaft 37. According to this construction, the pivot resistance of the second pivot shaft 37 is smaller than the pivot resistance of the first pivot shaft 36. Accordingly, when the door 20 is opened/closed, the second pivot shaft 37 will pivot more easily than the first pivot shaft 36. In order to adjusting the shaft interference, it is conceivable that a smaller diameter part is formed inside the shaft tubes 33a or 33b, alternatively that a collar as a separated member from a bushing is inserted into the shaft tube 33a whereby increasing the interference.

(b) Construction of Stopper

Figure 6:
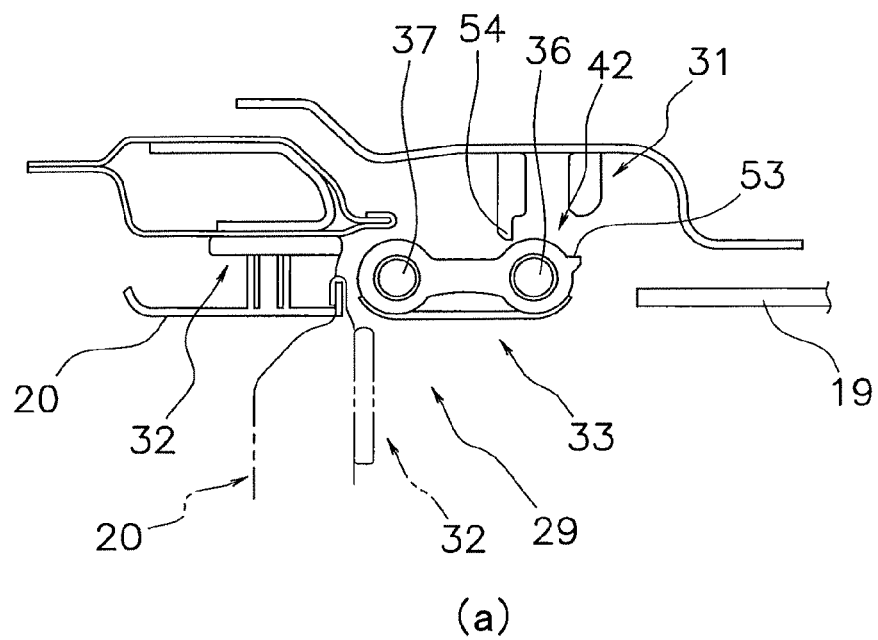
FIG. 6 includes cross-sectional views showing the hinge structure shown in FIG. 2 taken along the line VI-VI.
Figure 6:
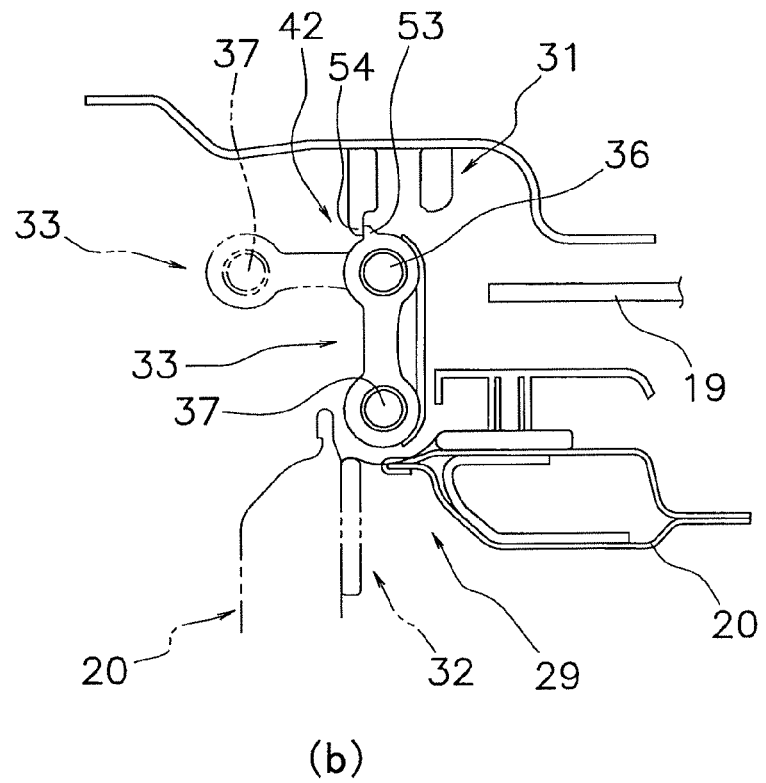
Figure 7:
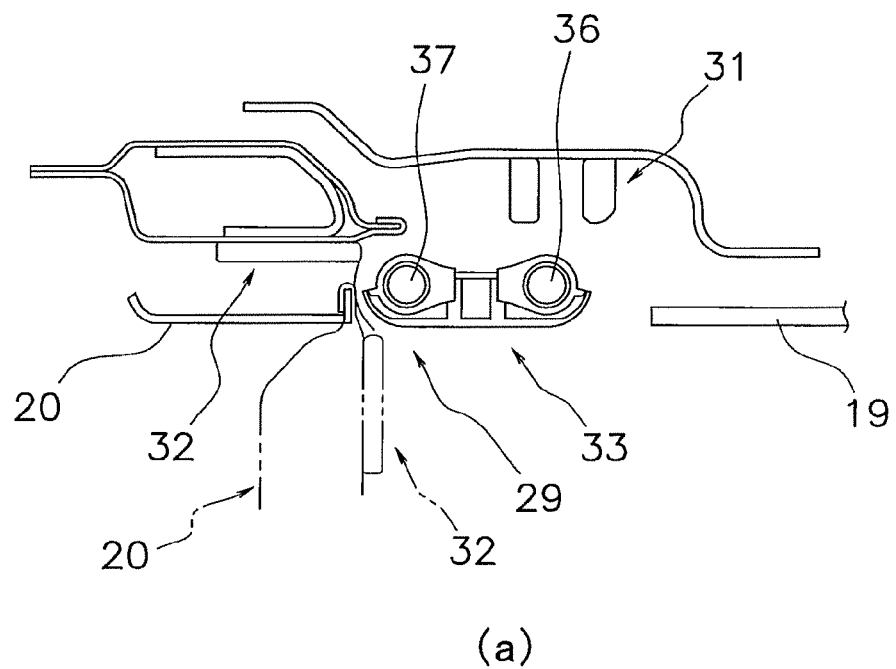
FIG. 7 includes cross-sectional views showing the hinge structure shown in FIG. 2 taken along the line VII-VII.
Figure 7:
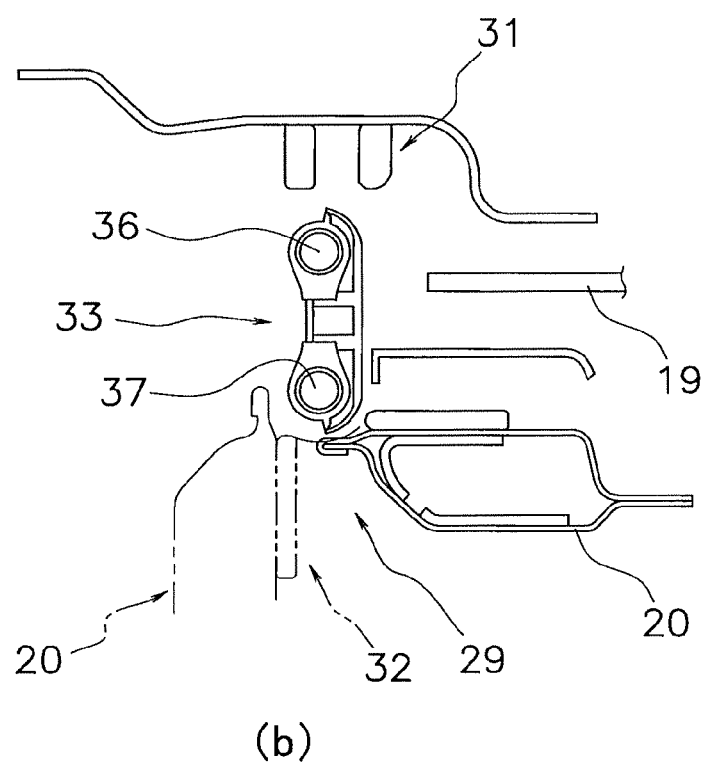
Figure 8:
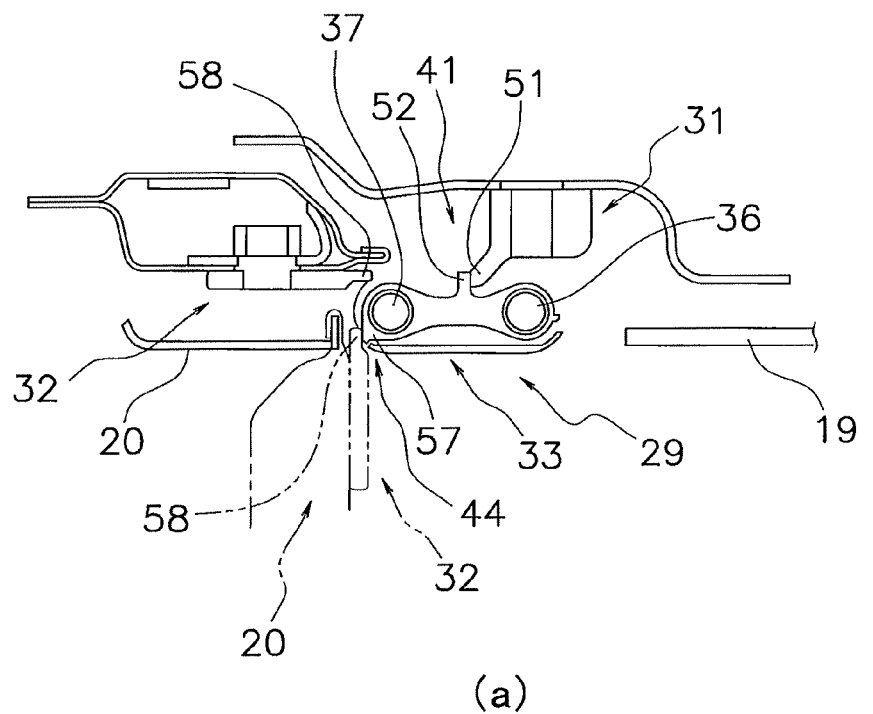
FIG. 8 includes cross-sectional views showing the hinge structure shown in FIG. 2 taken along the line VIII-VIII.
Figure 8:
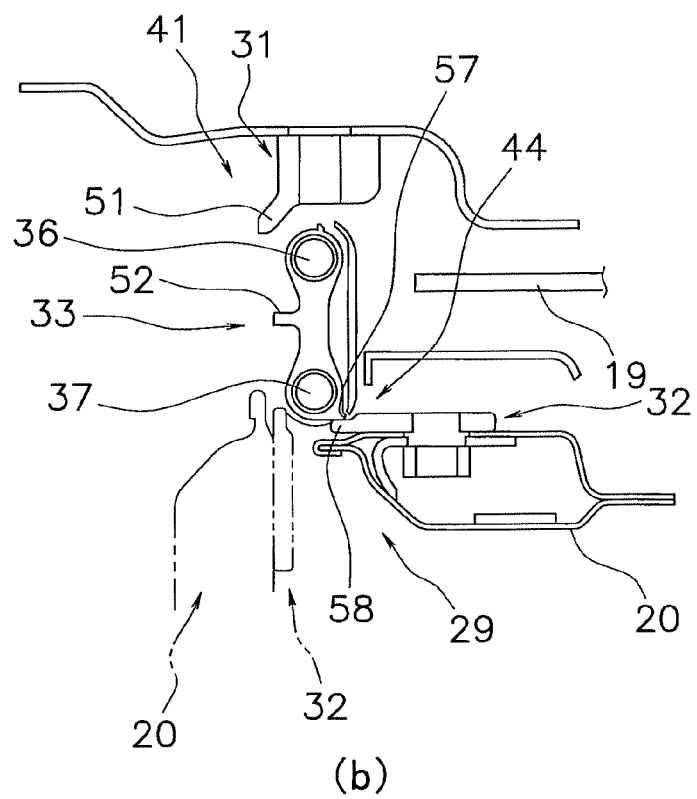
Figure 9:
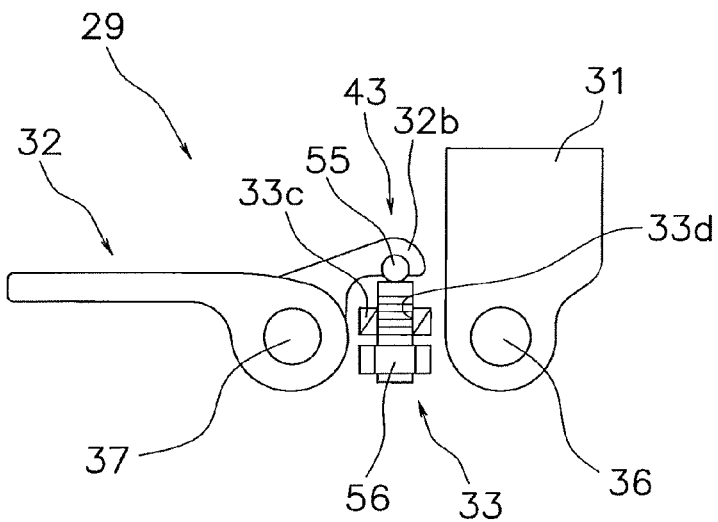
FIG. 9 is a schematic view for illustrating an adjustment member of a door closing side stopper of a second stopper.

With reference to FIGS. 6, 8, and 9, the following description will describe stoppers that regulate the pivot angles of members. The hinge 29 has first stoppers 41 and 42, and second stoppers 43 and 44. The first stoppers 41 and 42 are structures that regulate the pivot angle of the first member 31 with respect to the interposed member 33. The second stoppers 43 and 44 are structures that regulate the pivot angle of the interposed member 33 with respect to the second member 32.

(b-1) First Stopper

The first stoppers 41 and 42 limit the maximum value of the pivot angle of the first member 31 relative to the interposed member 33 to about 90 degrees. The first stoppers 41 and 42 include a door closing side stopper 41 and a door opening side stopper 42.

The door closing side stopper 41 defines the limit position when the interposed member 33 pivots in a clockwise direction about the first member 31. The door closing side stopper 41 is composed of the combination of a first contact portion 51 of the first member 31, and a second contact portion 52 of the interposed member 33. The first contact portion 51 is a protrusion that is formed on the vertically central part of the front side surface of the first member 31, as shown in FIG. 4. The second contact portion 52 is a protrusion that is formed on the vertically central part of the back side surface of the interposed member 33, as shown in FIG. 4. When the door 20 is closed, the first contact portion 51 and the second contact portion 52 contact each other in the pivot direction of the first pivot shaft 36, as shown in FIGS. 4 and 8(a).

The door opening side stopper 42 defines the limit position when the interposed member 33 pivots in a counterclockwise direction about the first member 31. The door closing side stopper 41 is composed of the combination of a third contact portion 53 of the first member 31, and a fourth contact portion 54 of the interposed member 33. The third contact portion 53 is a protrusion that is formed on the upper part of the front side surface of the first member 31, as shown in FIG. 4. The fourth contact portion 54 is a protrusion that is formed on the upper part of the side surface of the interposed member 33, as shown in FIG. 3. When the door 20 is opened 180 degrees from the closed position, the third contact portion 53 and the fourth contact portion 54 contact each other in the pivot direction of the first pivot shaft 36, as shown in FIG. 6(b).

(b-2) Second Stopper

The second stoppers 43 and 44 limits the maximum pivot angle of the interposed member 33 relative to the second member 32 to about 90 degrees as shown in FIGS. 8(b) and 9. The second stoppers 43 and 44 include a door closing side stopper 43 and a door opening side stopper 44.

The door closing side stopper 43 defines the limit position when the second member 32 pivots in a clockwise direction about the interposed member 33. The door closing side stopper 43 is composed of the combination of a fifth contact portion 55 of the second member 32, and a sixth contact portion 56 of the interposed member 33. The fifth contact portion 55 is composed of sectionally-circular pins arranged on a pair of protrusions 32b that extend rearward from the vertically both end parts of the rear-side part on the back side of the second member 32, as shown in FIGS. 4 and 9. The pins are formed of a hard material with high hardness as compared with the material of the protrusions 32b. Accordingly, the fifth contact portion 55 has abrasion resistance when contacting the end of a bolt. The sixth contact portion 56 is composed of bolts that are arranged in the interposed member 33, as shown in FIGS. 4 and 9. The protrusions 33c are formed to protrude from the both vertically end parts of the interposed member 33. Screw holes 33d are formed in the protrusions 33c. The bolts are screwed into the screw holes 33d. More specifically, the bolts are screwed into the screw holes 33d formed in the protrusions 33c of the interposed member 33 from the exterior side so that the ends of the bolts protrude from the back side of the interposed member 33. When the door 20 is closed, the fifth contact portion 55 and the sixth contact portion 56 (specifically, the end of the bolt) contact each other in the pivot direction of the second pivot shaft 37, as shown in FIGS. 5(a) and 9.

When rotated relative to the interposed member 33, the bolt as the sixth contact portion 56 moves in the axial direction so that the gap angle between the bolt and the fifth contact portion 55 can be adjusted. Thus, the regulation angle of the door closing side stopper 43 can be adjusted.

The door opening side stopper 44 defines the limit position when the second member 32 pivots in a counterclockwise direction about the interposed member 33. The door closing side stopper 44 is composed of the combination of a seventh contact portion 57 of the second member 32, and an eighth contact portion 58 of the interposed member 33. The seventh contact portion 57 is a protrusion that is formed on the vertically central part of the rear end part on the back side of the first member 32, as shown in FIG. 4. The eighth contact portion 58 is a protrusion that is formed on the vertically central part of the front side on the exterior side of the interposed member 33, as shown in FIG. 3. When the door 20 is opened 180 degrees from the closed position, the seventh contact portion 57 and the eighth contact portion 58 contact each other in the pivot direction of the second pivot shaft 37, as shown in FIG. 8(b).

Construction of Engaging Mechanism 26

Figure 10:
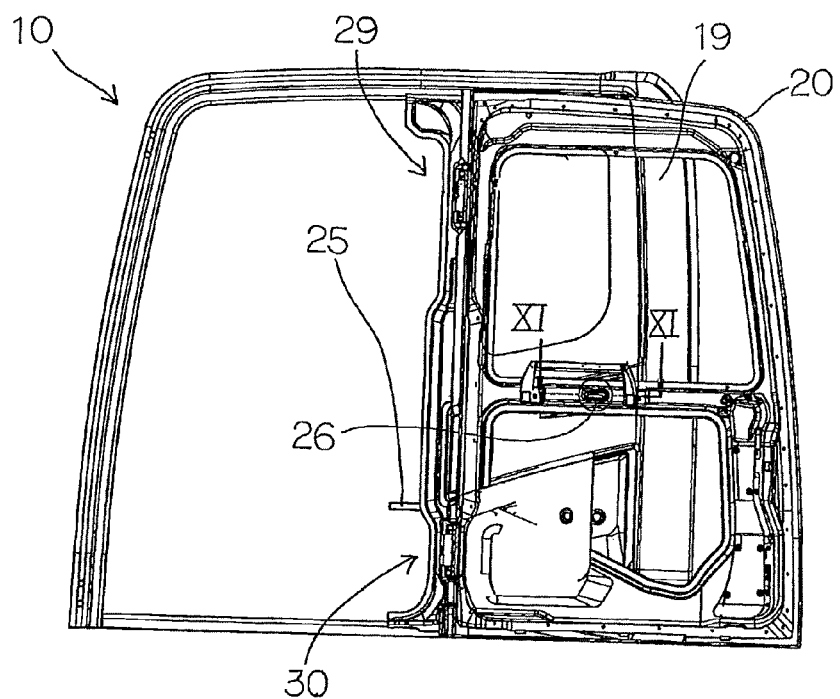
FIG. 10 is a side view showing the cab with the door being fully opened.

The engaging mechanism 26 fastens the door 20 to the side wall 19 in fully opened position where the door 20 is opened 180 degrees as shown in FIG. 10. Thus, the engaging mechanism serves to prevent that the door 20 wobbles when the door 20 is opened. The engaging mechanism 26 includes a striker 27 that is arranged on the outer side surface of the door 20, and a lock plate 28 that is arranged on the side wall 19, as shown in a cross-sectional view of FIG. 11 taken along the line XI-XI in FIG. 10. The striker 27 is a U-shaped member, and protrudes from the door 20. The lock plate 28 is pivotally supported in the side wall 19, and is brought into an engaged state with the striker 27 when the striker 27 contacts the lock plate 28. This engaged state can be disengaged by operating an inner handle 25.

Figure 12:
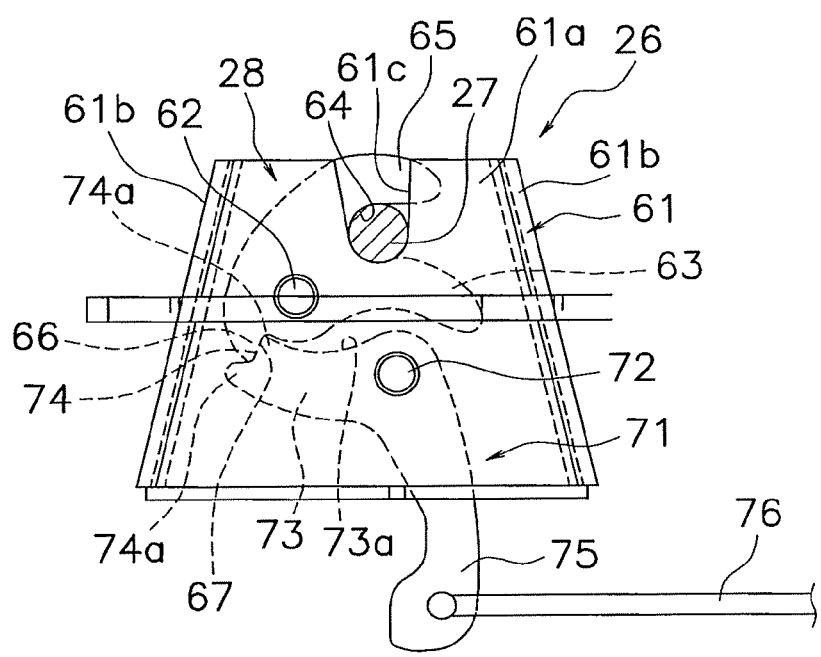
FIG. 12 is a schematic view showing the construction of an engaging portion, specifically, with an engaging portion engaging with the striker.
Figure 13:
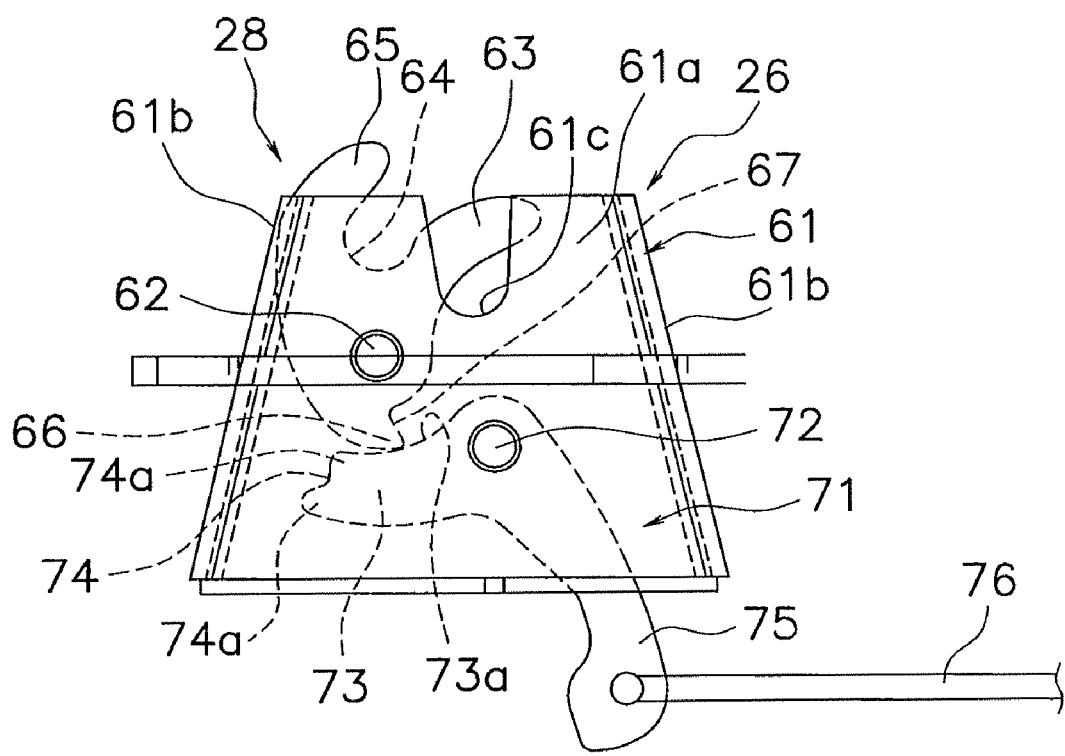
FIG. 13 is a schematic view showing the construction of the engaging part, specifically, with the engaging portion disengaging from the striker by pulling wire.

With reference to FIGS. 12 and 13, the construction of the engaging mechanism 26 and engaging/disengaging action are now described in more detail. FIG. 12 shows the disengaged state where the striker 27 is disengaged from the engaging mechanism 26. FIG. 13 shows the engaged state where the striker 27 is engaged with the engaging mechanism 26.

The engaging mechanism 26 mainly has a stationary member 61, the lock plate 28, and a stopper plate 71. The stationary member 61 is secured to the side wall 19, and pivotally supports the lock plate 28 and the stopper plate 71. The lock plate 28 brings the striker 27 in locked/unlocked states where the striker 27 engages/disengages with/from the stationary member 61. The stopper plate 71 enables/disables pivoting of the lock plate 28.

The stationary member 61 is arranged in the side wall 19, and includes upper and lower walls 61 and front and rear side wall portions 61b that define a box shape. An engagement cut-out portion 61c for holding the striker 27 is formed in the machine outer side surfaces of upper and lower wall portions 61a.

The lock plate 28 is arranged inside the stationary member 61, and is pivotally supported on the stationary member 61 by a first pivot portion 62 that extends in the vertical direction. The first pivot portion 62 is arranged at a position located diagonally inward relative to the engagement cut-out portion 61c as viewed in the Figures. The lock plate 28 includes a first protruding portion 63 that extends from a part in proximity to the first pivot portion 62 toward the engagement cut-out portion 61c. In addition, the lock plate 28 includes a second protruding portion 65 that extends in the same direction as the first protruding portion 63 from the part spaced at an interval in the counterclockwise direction away from the first protruding portion 63. A recessed portion 64 with concave shape is formed between the first protruding portion 63 and the second protruding portion 65. The entire shapes of the first protruding portion 63 and the second protruding portion 65 are smoothly curved along the clockwise rotation in the Figures. In addition, the lock plate 28 includes a protruding engaging portion 66. The protruding engaging portion 66 is formed on one of the opposite sides of the first pivot portion 62 opposite to the first protruding portion 63. The clockwise surface of the protruding engaging portion 66 is curved in a concave shape. The counterclockwise surface of the protruding engaging portion 66 is a roughly straight surface, and forms a recessed portion 67.

The stopper plate 71 is arranged further inward of the machine with respect to the lock plate 28. The stopper plate 71 is pivotally supported on the stationary member 61 by a second pivot portion 72 that extends in the vertical direction. The stopper plate 71 includes a first extending portion 73 that extends leftward in the Figures from a part in proximity to the second pivot portion 72. An end recessed part 74 is fondled on the end surface of the first extending portion 73. The end recessed part 74 is defined by end protruding parts 74a that are arranged on the both sides of the end recessed part 74. Also, a clockwise surface 73a of the first extending portion 73 serves as a cam surface curved in a concave shape. The stopper plate 71 includes a second extending portion 75 that extends diagonally rightward in the Figures from a part in proximity to the second pivot portion 72. The second extending portion 75 protrudes from the stationary member 61. An end of wire 76 is pivotally coupled to the end of the second extending portion 75. Operation force can be applied to the wire 76 through the inner handle 25.

FIG. 12 shows a locked state where operation force is not applied to the stopper plate 71 through the wire 76 so that the striker 27 is caught in the engagement cut-out portion 61c of the stationary member 61 and engages with the lock plate 28. The striker 27 also engages with the recessed portion 64 of the lock plate 28. The second protruding portion 65 of the lock plate 28 is arranged inward of machine with respect to the striker 27. Also, the protruding engaging portion 66 of the lock plate 28 engages with the end recessed part 74 of the stopper plate 71. Also, the end protruding part 74a of the stopper plate 71 engages with the recessed portion 67 of the lock plate 28. In this state, the lock plate 28 cannot pivot counterclockwise. The reason is that, even when external force is applied to the lock plate 28, the force applied from the lock plate 28 to the stopper plate 71 is not applied to the stopper plate 71 in a direction where the stopper plate 71 can pivot. For this reason, the striker 27 cannot disengage from the stationary member 61.

Then, when the operator operates the inner handle 25 of the door 20, the wire 76 is pulled. Thus, the stopper plate 71 pivots counterclockwise about the second pivot portion 72. Accordingly, the stopper plate 71 disengages from the lock plate 28. In this unlocked state, if the striker 27 pushes the second protruding portion 65 of the lock plate 28 outward of the machine, the lock plate 28 pivots counterclockwise about the first pivot portion 62. As a result, the engaging mechanism is bought into the state shown in FIG. 13. The lock plate 28 pivots to the furthest counterclockwise position. The protruding engaging portion 66 is supported on the clockwise surface 73a of the first extending portion 73 of the stopper plate 71.

That is, in the case where the striker 27 of the stepping-into/off door 20 disengages from the lock plate 28, the engaging mechanism is kept in the state shown in FIG. 13. If the door 20 is opened about 180 degrees, the striker 27 moves toward the engagement cut-out portion 61c of the stationary member 61 and then pushes the first protruding portion 63 of the lock plate 28 so that the engagement cut-out portion 61c receives the striker 27. The lock plate 28 pivots clockwise about the first pivot portion 62 so that, as shown in FIG. 12, the second protruding portion 65 is positioned outside the striker 27 with the striker 27 being in contact with the bottom of the engagement cut-out portion 61c (FIG. 12).

Workings of Hinge 29, 30

The following description will describe workings of the hinges 29 and 30 when the stepping-into/off door 20 is opened/closed. FIGS. 5(a), 6(a), 7(a) and 8(a) show the hinge with the door 20 being closed. FIGS. 5(b), 6(b), 7(b) and 8(b) show the hinge with the door 20 being opened 180 degrees. Note that dashed two-dotted lines in the Figures show the hinge in the position where the door 20 is opened 90 degrees.

(a) Opening Workings

In the case where the stepping-into/off door 20 is closed, as shown in FIG. 8(a), the door closing side stopper 41 of the first stoppers 41 and 42 prevents that the interposed member 33 pivots clockwise relative to the first member 31. Also, as shown in FIG. 5(a), the door closing side stopper 43 of the second stoppers 43 and 44 prevents that the second member 32 pivots clockwise relative to the interposed member 33.

When the operator of the hydraulic excavator 1 opens the stepping-into/off door 20 from this position, the stepping-into/off door 20 first pivots about the second pivot shaft 37 as the pivot axis as shown in FIG. 8(b). That is, the second member 32 starts pivoting counterclockwise relative to the interposed member 33. Thus, the interposed member 33 cannot pivot relative to the first member 31, but the second member 32 can pivot relative to the interposed member 33. In this pivot movement, the fifth contact portion 55 moves away from the sixth contact portion 56 in the door closing side stopper 43 of the second stoppers 43 and 44.

When the operator further open the stepping-into/off door 20 so that the second member 32 pivots 90 degrees relative to the interposed member 33, as shown in FIG. 8(a), the eighth contact portion 58 (dashed two-dotted line) contacts the seventh contact portion 57 in the door opening side stopper 44 of the second stoppers 43 and 44.

When the operator further opens the stepping-into/off door 20, the second member 32 and the interposed member 33 pivot integrally with each other about the first pivot shaft 36 as the pivot axis relative to the first member 31. That is, the second pivot shaft 37 moves together with the interposed member 33, and the like. As a result, the second contact portion 52 moves away from the first contact portion 51 in the door closing side stopper 41 of the first stoppers 41 and 42.

When the operator further opens the stepping-into/off door 20, as shown in FIG. 6(*b*), the third contact portion 53 contacts the fourth contact portion 54 in the door opening side stopper 42 of the first stoppers 41 and 42. Thus, the second member 32 and the interposed member 33 stop pivoting relative to the first member 31. In this contact state, the interposed member 33 pivots 90 degrees relative to the first member 31, and in addition the second member 32 pivots 90 degrees relative to the interposed member 33. Totally, the second member 32 pivots 180 degrees relative to the first member 31.

Accordingly, the stepping-into/off door 20 is opened 180 degrees relative to the side wall 19. As a result, the door opening operation is completed.

Figure 11:
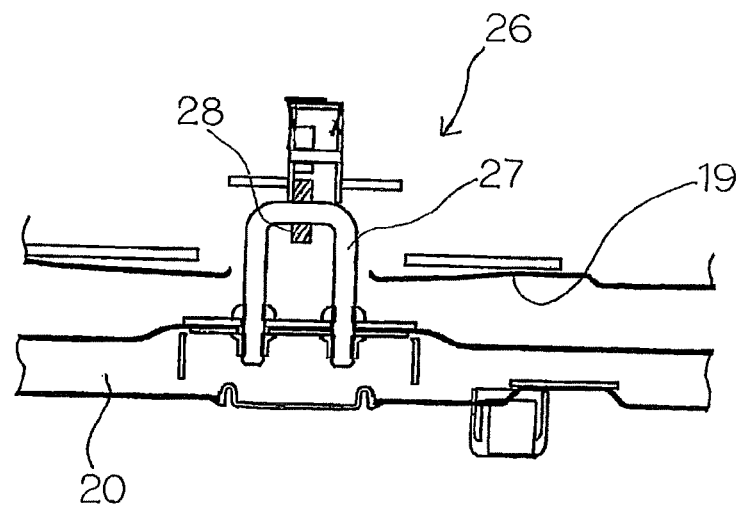
FIG. 11 is a cross-sectional view showing a part of the cab shown in FIG. 10 taken along the line XI-XI for illustrating engaging state of a striker with a lock plate.

Thus, the stepping-into/off door 20 is positioned in parallel to the side wall 19 in this fully-open position. Also, in the engaging mechanism 26, as shown in FIG. 11, the striker 27 of the door 20 engages with the lock plate 28 of the side wall 19. That is, the stepping-into/off door 20 is fastened to the side wall 19. In addition, since the accuracy of angle regulation of the hinges 29 can be high, the door 20 is surely fastened to the side wall 19 by the engaging mechanism 26. In other words, in the engaging mechanism 26, the striker 27 accurately moves to the position of the lock plate 28.

The following description will describe the aforementioned opening workings of the stepping-into/off door 20 with reference to perspective views showing the construction of the entire cab 10 and the hinge 29 for ease of understanding.

Figure 15:
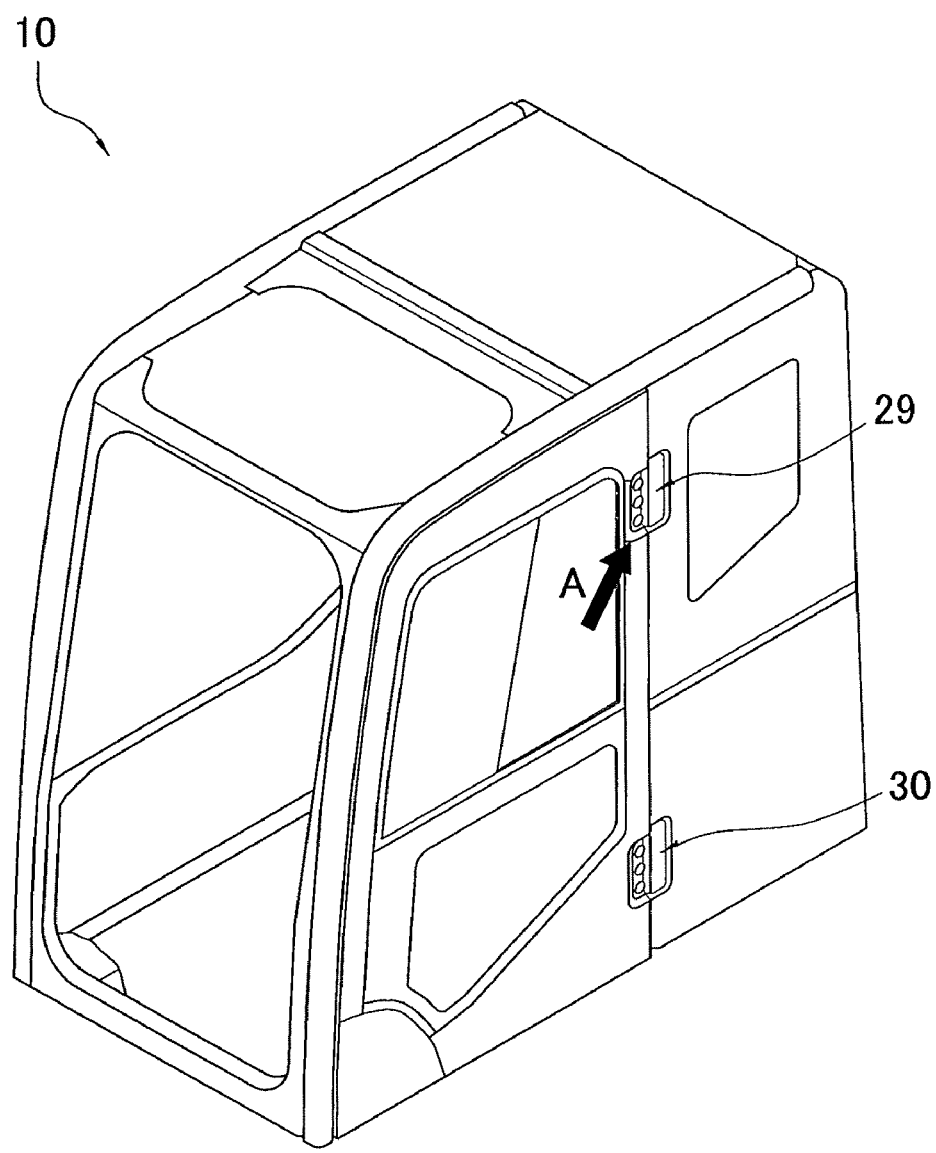
FIG. 15 is a perspective view showing the cab installed on the hydraulic excavator shown in FIG. 1 with the door being closed.
Figure 16:
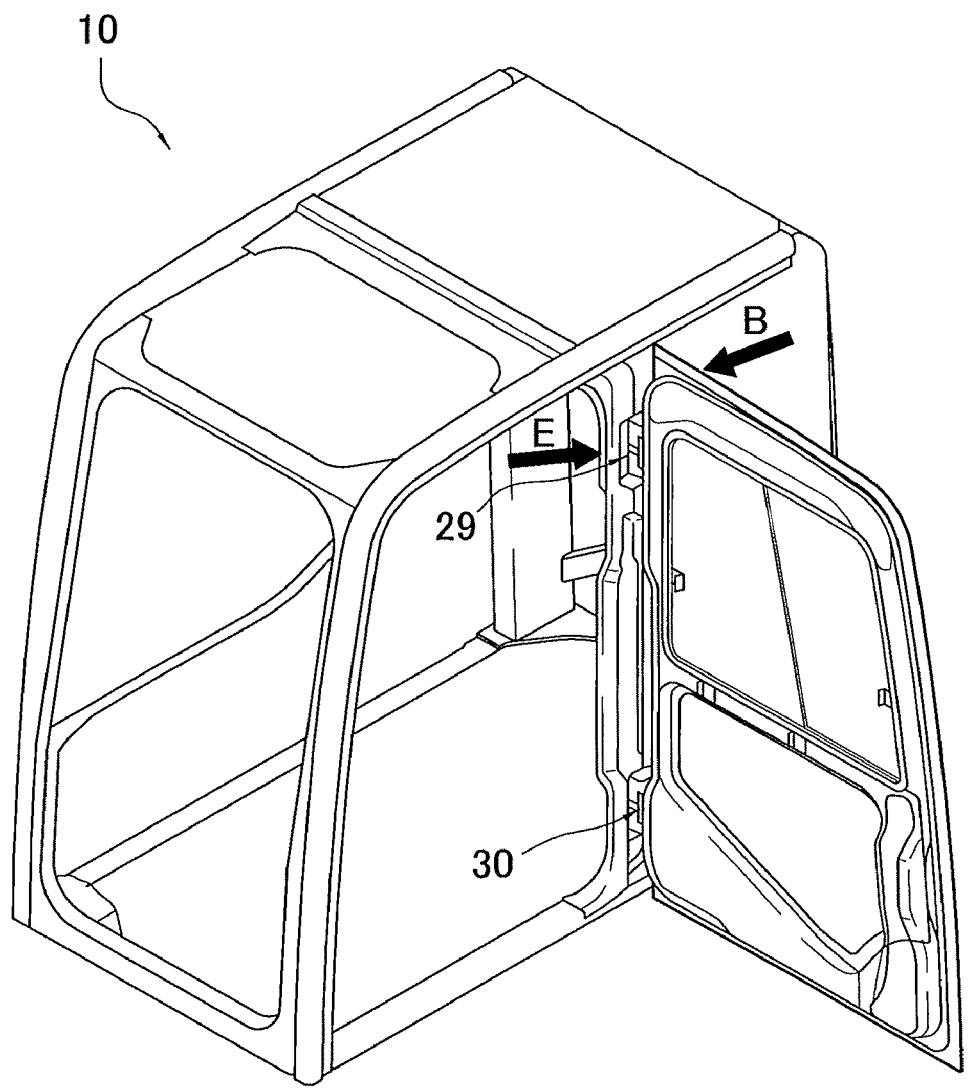
FIG. 16 is a perspective view showing the cab installed on the hydraulic excavator shown in FIG. 1 with the door being opened 90 degrees.
Figure 17:
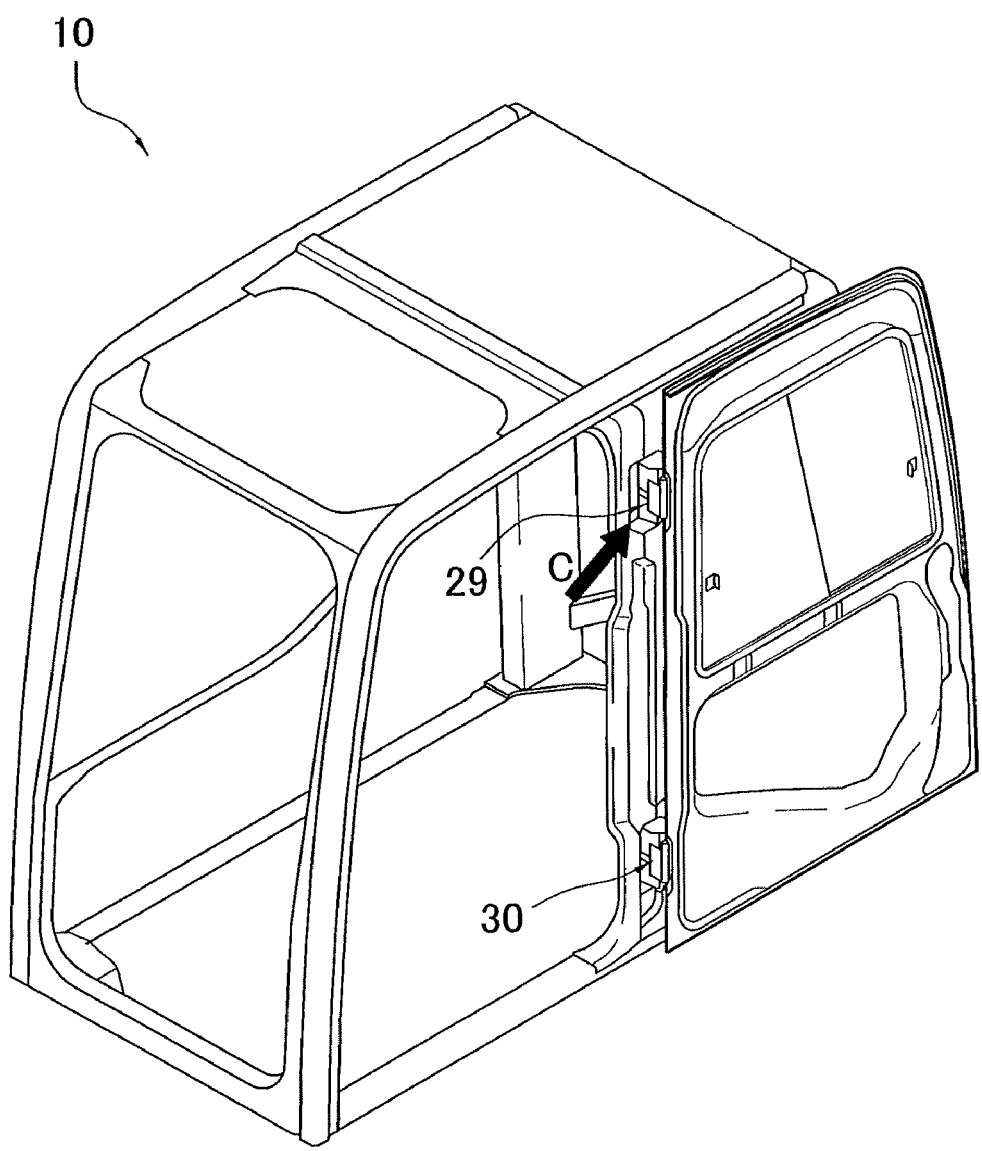
FIG. 17 is a perspective view showing the cab installed on the hydraulic excavator shown in FIG. 1 with the door being opened 180 degrees.

The working processes of hinge 29 are first described in the cab 10 from the closed state where the stepping-into/off door 20 is closed as shown in FIG. 15, through the 90-degree opened state where the stepping-into/off door 20 is opened the 90 degrees as shown in FIG. 16, to the 180-opened state where the stepping-into/off door 20 is opened 180 degrees as shown in FIG. 17. The arrows shown in FIGS. 17 to 15 indicate the perspective viewing angles of the later-discussed perspective views (FIGS. 18 to 23).

Figure 18:
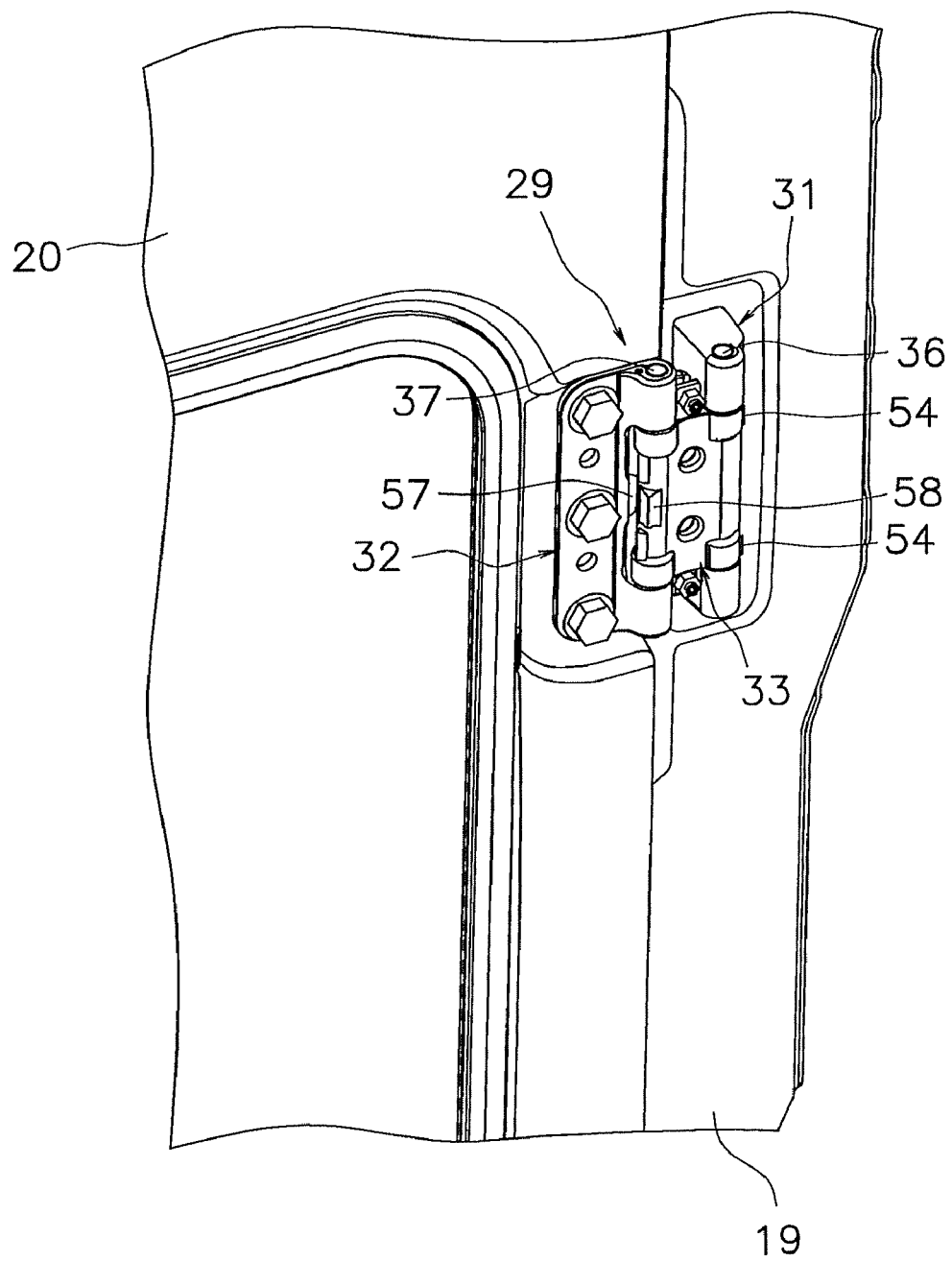
FIG. 18 is a perspective view showing the hinge structure with the door being closed shown in FIG. 15 as viewed of the outside of the cab.
Figure 19:
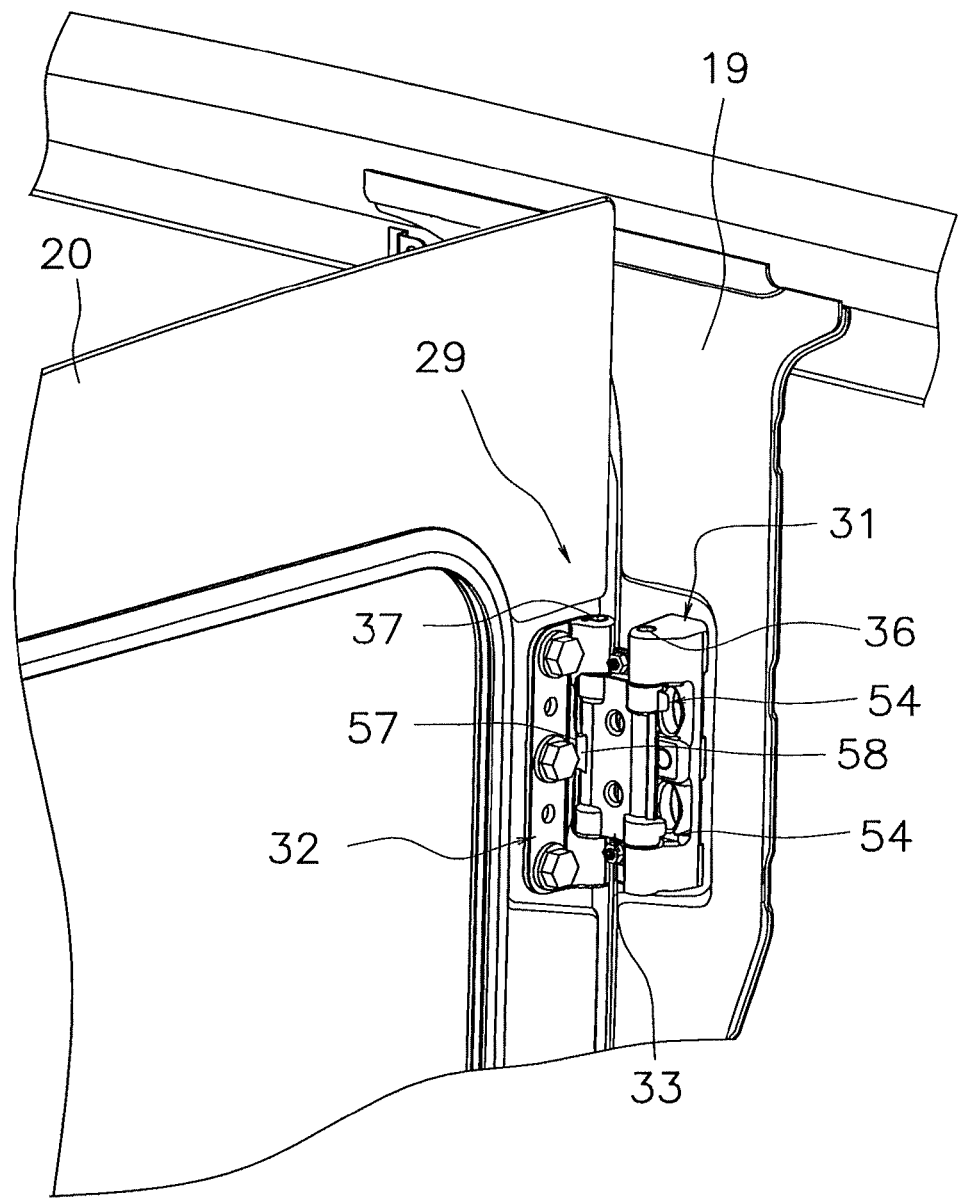
FIG. 19 is a perspective view showing the hinge structure with the door being opened 90 degrees shown in FIG. 16 as viewed of the outside of the cab.
Figure 20:
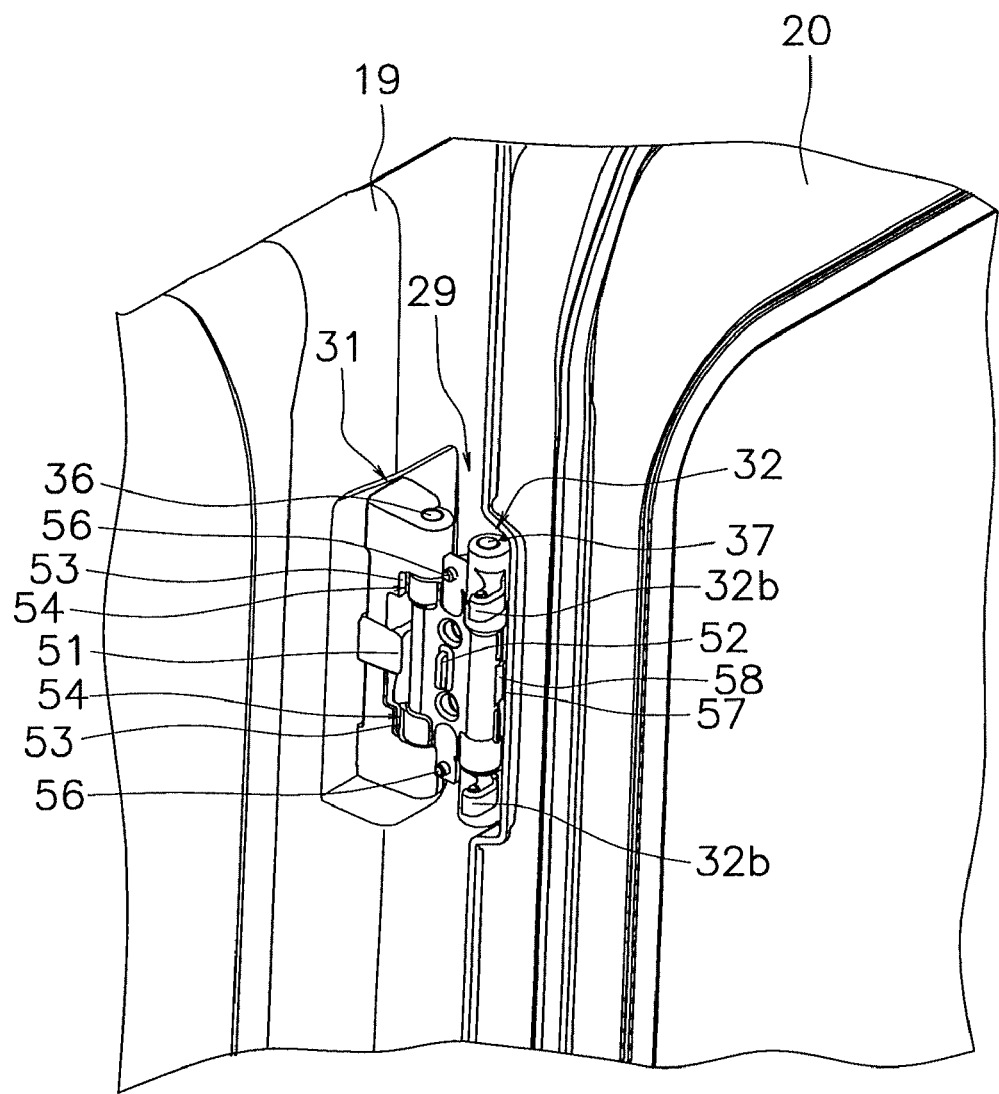
FIG. 20 is a perspective view showing the hinge structure with the door being opened 180 degrees shown in FIG. 17 as viewed of the outside of the cab.

That is, FIG. 18 is the perspective view of the hinge 29 as viewed the direction indicated by the arrow A in FIG. 15. FIG. 19 is the perspective view of the hinge 29 as viewed the direction indicated by the arrow B in FIG. 16. FIG. 20 is the perspective view of the hinge 29 as viewed the direction indicated by the arrow C in FIG. 17.

The following description will describe the workings of the members of the hinge 29. The same goes for the hinge 30.

That is, when the stepping-into/off door 20 is opened from the closed position shown in FIG. 18, since the interference (pivot resistance force) difference exists between the first pivot shaft 36 and the second pivot shaft 37, the second member 32 (stepping-into/off door 20) will pivot about the second pivot shaft 37 as the pivot axis relative to the interposed member 33. In this pivot movement, when the second member 32 (stepping-into/off door 20) pivots about 90 degrees relative to the interposed member 33 as shown in FIG. 19, the seventh contact portion 57 on the second member 32 side contact the eighth contact portion 58 on the interposed member 33 side. Thus, the pivot movement between the members 32 and 33 is completed.

When the stepping-into/off door 20 is further opened from the 90-degree opened position shown in FIG. 19, the second member 32 and the interposed member 33 pivot integrally with each other about the first pivot shaft 36 as the pivot axis relative to the first member 31. After that, when the interposed member 33 pivots about 90 degrees relative to the first member 31 (the second member 32 pivots about 180 degree relative to the first member 31) with the second member 32 (stepping-into/off door 20) and the interposed member 33 pivoting integrally with each other, the fourth contact portion 54 of the interposed member 33 contact the third contact portion 53 of the first member 31 (see FIG. 20). Thus, the pivot movement about the first pivot shaft 36 between the members 31 and 33 is completed.

In the aforementioned processes, the stepping-into/off door 20 is opened 180 degrees relative to the side wall 19. Thus, the opening operation of the stepping-into/off door 20 is completed.

Figure 24:
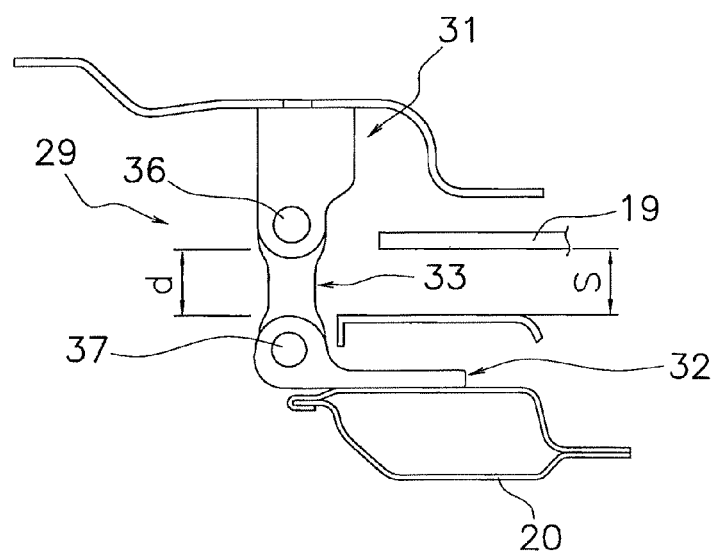
FIG. 24 is a cross-sectional view showing the relationship between the width of the gap between the door and the side wall when the door is opened 180 degrees as shown in FIG. 17, and the width of the coupling part of the interposed member.

As shown in FIG. 24, the gap S between the surface of the stepping-into/off door 20 and the surface of the side wall 19 falls within the range of 10 to 40 mm when the stepping-into/off door 20 is opened 180 degrees relative to the side wall 19. Also, this gap S is the same width as the width d of the coupling portion in the interposed member 33. That is, when the stepping-into/off door 20 is opened 180 degrees, since the interposed member 33 is orientated at 90 degree with respect to the surface of the side wall 19, the width d of the coupling portion of the interposed member 33 directly defines the width of the gap S between the stepping-into/off door 20 and the side wall 10.

According to this construction, it is possible to reliably prevent that operator's fingers may be caught in the gap when the stepping-into/off door 20 is opened/closed. In addition, the width of the gap S between the stepping-into/off door 20 and the side wall 19 can be easily specified by adjusting the width d of the coupling portion of the interposed member 33.

(b) Closing Workings

In the case where the stepping-into/off door 20 is fully opened, as shown in FIG. 6(*b*), the door opening side stopper 42 of the first stoppers 41 and 42 prevents that the interposed member 33 pivots counterclockwise relative to the first member 31. Also, as shown in FIG. 8(*b*), the door opening side stopper 43 of the second stoppers 44 and 44 prevents that the second member 32 pivots clockwise relative to the interposed member 33.

When the operator closes the stepping-into/off door 20 from this position, the stepping-into/off door 20 first pivots about the second pivot shaft 37 as the pivot axis. That is, the second member 32 starts pivoting clockwise relative to the interposed member 33. Thus, the position of the interposed member 33 does not change relative to the first member 31, but the second member 32 can pivot relative to the interposed member 33. In this pivot movement, the eighth contact portion 58 moves away from the seventh contact portion 57 in the door opening side stopper 44 of the second stoppers 43 and 44.

When the operator further opens the stepping-into/off door 20, the second member 32 pivots 90 degrees relative to the interposed member 33. In this pivot movement, the fifth contact portion 55 contacts the sixth contact portion 56 in the door closing side stopper 43 of the second stoppers 43 and 44 (see FIG. 5).

When the operator further closes the stepping-into/off door 20, the second member 32 and the interposed member 33 pivot integrally with each other about the first pivot shaft 36 as the pivot axis relative to the first member 31. That is, the second pivot shaft 37 moves together with members such as the interposed member 33. As a result, the third contact portion 53 moves away from the fourth contact portion 56 in the door opening side stopper 42 of the first stoppers 41 and 42.

When the operator further closes the stepping-into/off door 20, the second contact portion 52 contacts the first contact portion 51 in the door closing side stopper 41 of the first stoppers 41 and 42. Thus, the second member 32 and the interposed member 33 stop pivoting relative to the first member 31.

Accordingly, the door 20 is closed. As a result, the door closing operation is completed.

As discussed above, since the shaft interference of the first pivot shaft 36 is specified smaller than the second pivot shaft 37 in this embodiment, only the second member 32 pivots in a first stage, and then the second member 32 and the interposed member 33 pivot in a second state so that the stepping-into/off door 20 can be opened to the fully-opened position in stages in door opening operation. Also, in door opening operation, only the second member 32 pivots in a first stage, and then the second member 32 and the interposed member 33 pivot in a second state so that the stepping-into/off door 20 can be closed to the closed position in stages.

The following description will describe the aforementioned closing workings of the stepping-into/off door 20 with reference to perspective views (FIGS. 21 to 23) showing the construction of the entire cab 10 and the hinge 29 for case of understanding.

Figure 21:
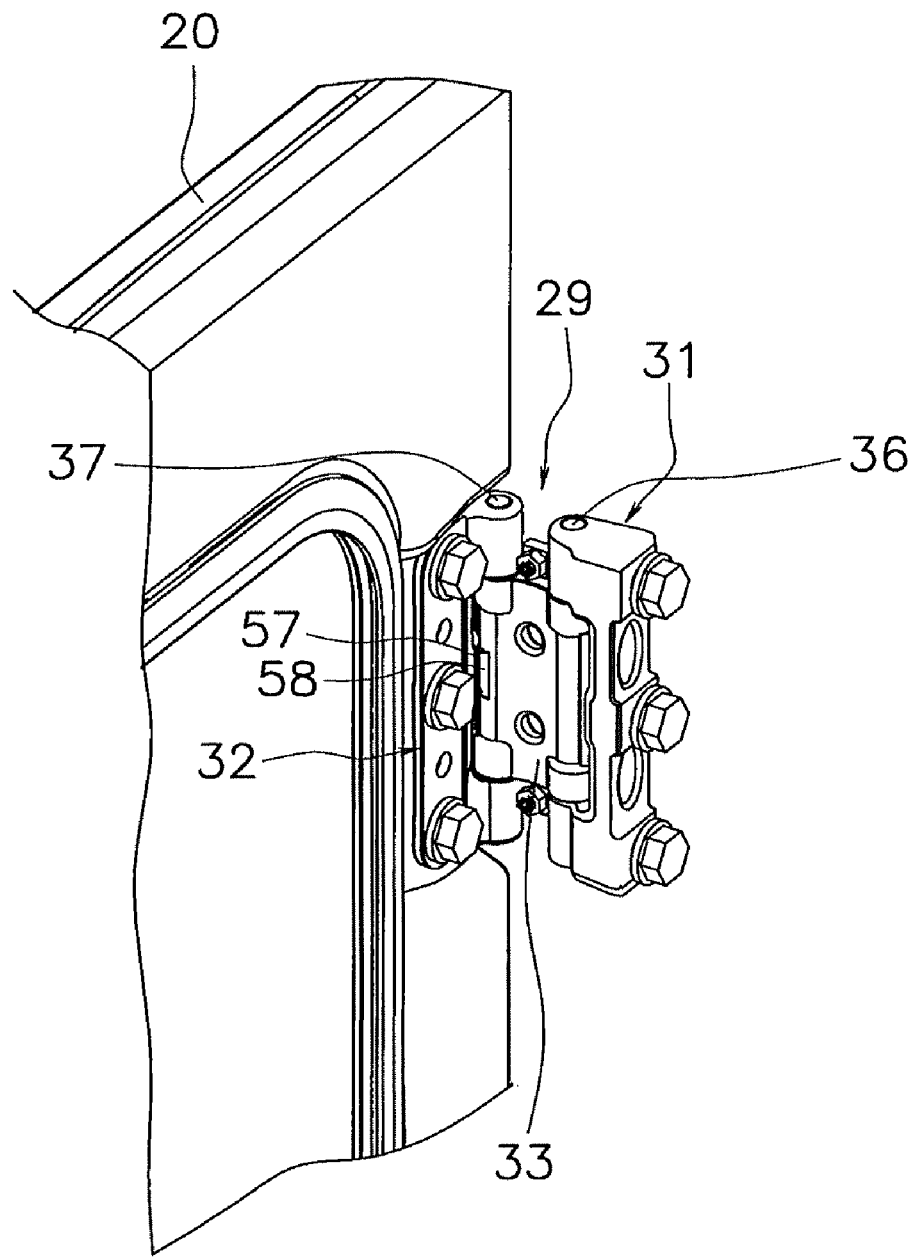
FIG. 21 is a perspective view showing the hinge structure with the door being opened 180 degrees shown in FIG. 17 as viewed of the inside of the cab.
Figure 22:
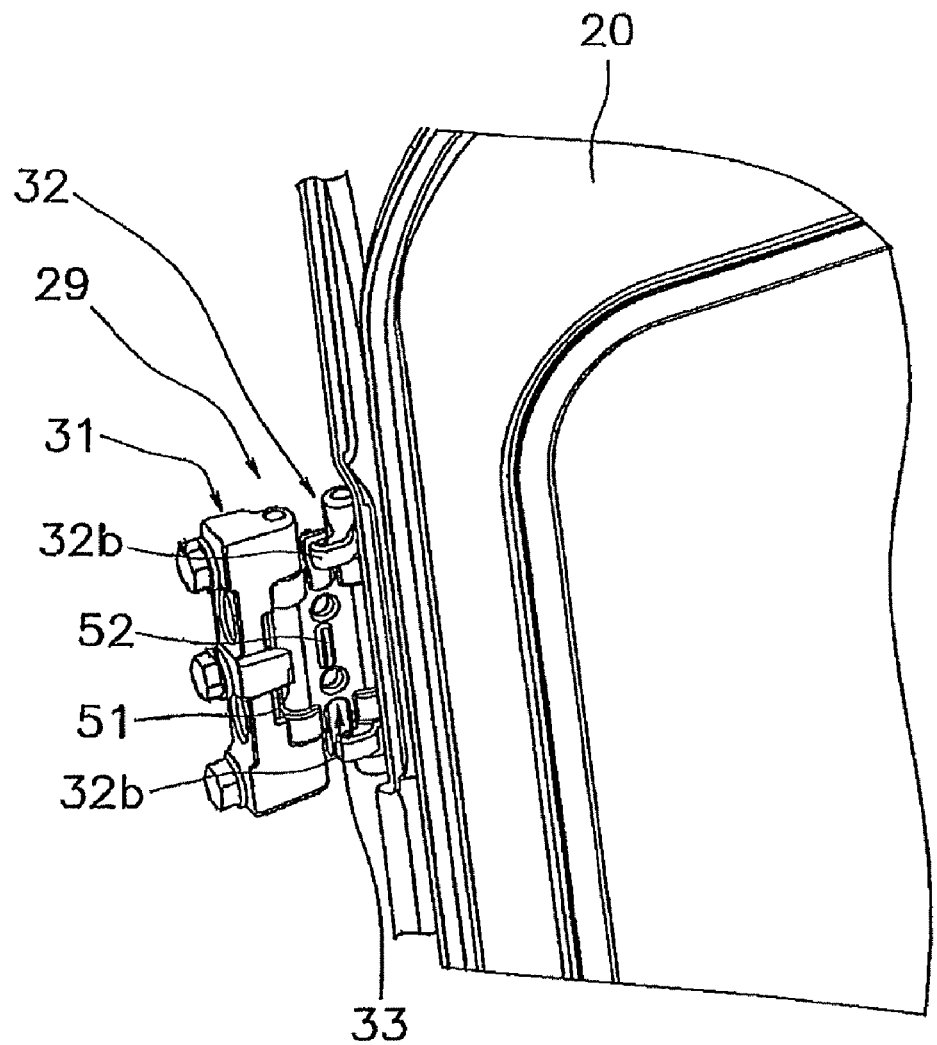
FIG. 22 is a perspective view showing the hinge structure with the door being closed 90 degrees shown in FIG. 16 as viewed of the inside of the cab.
Figure 23:
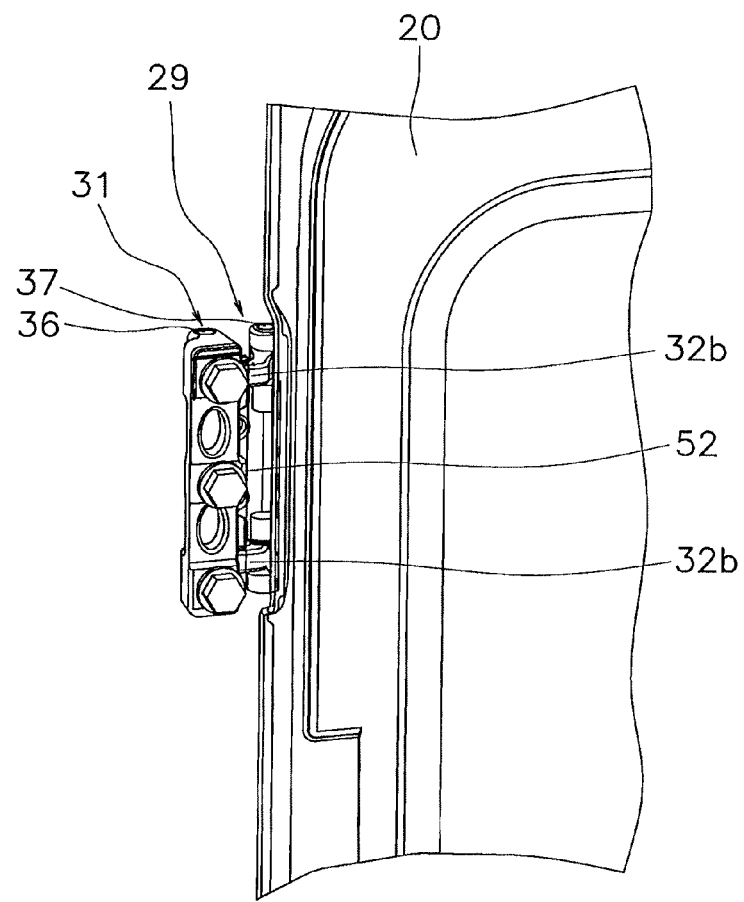
FIG. 23 is a perspective view showing the hinge structure with the door being closed shown in FIG. 15 as viewed of the inside of the cab.

FIG. 21 is the perspective view of the hinge 29 with the stepping-into/off door 20 being opened 180 degrees as shown in FIG. 17 as viewed from the rear side of the cab. FIG. 22 is the perspective view of the hinge 29 as viewed the direction indicated by the arrow E in FIG. 16. FIG. 23 is the perspective view of the hinge 29 with the stepping-into/off door 20 being closed as shown in FIG. 15 as viewed from the interior side of the cab.

That is, when the stepping-into/off door 20 is closed from the 180-degree opened position shown in FIG. 21, the second member 32 (stepping-into/off door 20) will pivot about the second pivot shaft 37 as the pivot axis relative to the interposed member 33. In this pivot movement, when the second member 32 (stepping-into/off door 20) pivots about 90 degrees relative to the interposed member 33 as shown in FIG. 22, the fifth contact portion 55, which is arranged on the end of the protrusion 32b on the second member 32 side, contacts the sixth contact portion 56 on the interposed member 33 side. Thus, the pivot movement between the members 32 and 33 is completed (see FIG. 20).

When the stepping-into/off door 20 is further closed from the 90-degree closed position shown in FIG. 22, the second member 32 and the interposed member 33 pivot integrally with each other about the first pivot shaft 36 as the pivot axis relative to the first member 31. After that, when the second member 32 (stepping-into/off door 20) and the interposed member 33 pivot about 90 degrees together with each other relative to the first member 31, the second contact portion 52 of the interposed member 33 contacts the first contact portion 51 of the first member 31. Thus, the pivot movement between the members 31 and 33 is completed. In this case, the second member 32 (stepping-into/off door 20) is brought in the closed position where the second member 32 pivots zero degree relative to the first member 31 (side wall 19) as shown in FIG. 23.

In the aforementioned processes, the stepping-into/off door 20 is closed from the 180-degree opened position where the stepping-into/off door 20 is opened 180 degrees relative to the side wall 19. Thus, the door closing operation is completed.

Referential Example

In the case where double-shaft hinges are used, if the pivot angles are not regulated when the door is fully opened 180 degrees from the closed position, positioning of the striker relative to the engaging member of the wall may be unstable. For this reason, there is a possibility that the striker of the door cannot engage with the engaging member of the wall at a certain position.

Figure 14:
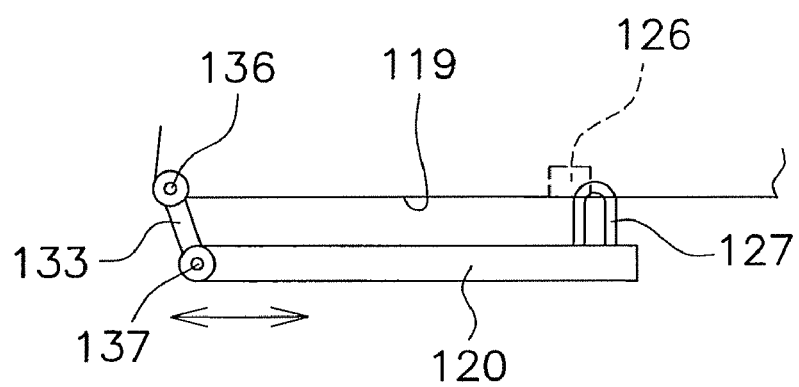
FIG. 14 includes schematic views showing a known door with a double-shaft hinge with the door being fully opened.
Figure 14:
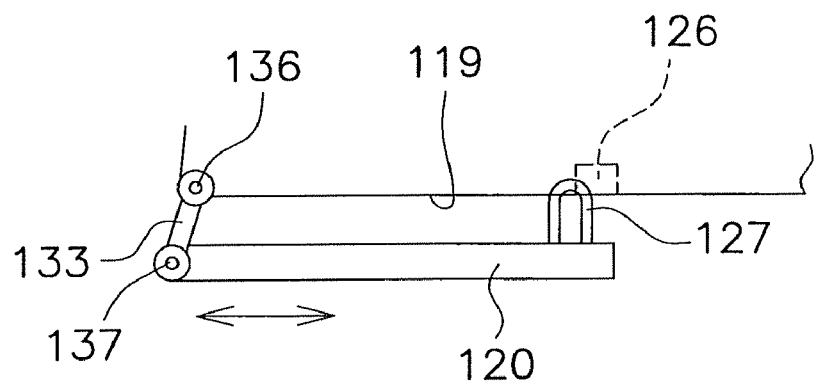

FIG. 14 is a schematic view showing an opening/closing structure of a door that includes the double-shaft hinges.

The double-shaft hinge 133 includes a first pivot shaft 136 that is arranged in a side wall 119 of a machine, and a second pivot shaft 137 that is arranged in the end of a door 120. A striker 127 is arranged on the door 120. It is expected that, when the door 120 is opened about 180 degrees from the closed position and is orientated in parallel to the side wall 119, the striker 127 is positioned at the position where the striker 127 can engage with the engagement member 126.

However, if the pivot angle of the first pivot shaft 136 exceeds 90 degrees while the pivot angle of the second pivot shaft 137 is less than 90 degrees as shown in FIG. 14($a$), or if the pivot angle of the first pivot shaft 136 is less than 90 degrees while the pivot angle of the second pivot shaft 137 exceeds 90 degrees as shown in FIG. 14($b$), even when the door 120 is orientated in parallel to the side wall 119, the position of the striker 127 disagree with the position of the engagement member 126. If disagreement occurs, adjustment operation will be required for moving the door 120 along the side wall 119 to adjust the position of the striker 127 to the position of the engaging member 126.

Features of the Embodiment (1) The cab 10 includes the wall that surrounds the operator's seat, the door 20, which is swingably mounted to the wall and can be opened to allow an operator to step into/off the cab, and the hinge 29. The hinge 29 includes the first member 31, the second member 32, the interposed member 33, the first stoppers 41 and 42, and the second stoppers 43 and 44. The first member 31 is secured to the side wall 19. The second member 32 is secured to the door 20. The interposed member 33 is pivotally coupled to the first member 31 and the second member 32 about the first pivot shaft 36 and the second pivot shaft 37, respectively. The first stoppers 41 and 42 include contact portions (first to fourth contact portions 51 to 54) that contact each other in the pivot direction so that the pivot angle between the first member 31 and the interposed member 33 is limited to a first angle. The second stoppers 43 and 44 include contact portions (fifth to eighth contact portions 55 to 58) that contact each other in the pivot direction so that the pivot angle between the second member 32 and the interposed member 33 is limited to a second angle. The full open position of the striker 27 agrees with the engagement position of the side wall 19. At the full open position of the striker 27, the stepping-into/off door 20 swings at the angle of the sum of the first and second angles to be opened. At the engagement position of the side wall 19, the striker 27 of the door 20 engages with the lock plate 28 as stopper member arranged on the side wall 19.

According to this cab 10 for a construction machine, when the door 20 is opened/closed relative to the side wall 19, the first member 31 and the interposed member 33 pivot relative to each other, and the second member 32 and the interposed member 33 pivot relative to each other. According to this construction, the door 20 can swing a wide angle relative to the side wall 19. The pivot angle between the first member 31 and the interposed member 33 is regulated by the first stoppers 41 and 42, while the pivot angle between the second member 32 and the interposed member 33 is regulated by the second stoppers 43 and 44. According to this construction, since the door 20 can be positioned relative to the side wall 19, it is not necessary to adjust the position of the striker 27 of the door 20 relative to the lock plate 28.

The full open position of the striker 27 agrees with the engagement position of the wall. At the full open position of the striker 27, the door 20 swings at the total angle 180 degrees of the first and second angles to be opened. At the engagement position of the wall, the striker 27 of the door 20 engages with the engaging mechanism 26 arranged on the wall.

(2) The pivot angle of the first pivot shaft 36 is about 90 degrees, while the pivot angle of the second pivot shaft 37 is about 90 degrees. According to this cab 10 for a construction machine, when the interposed member 33 pivots about 90 degrees relative to the first member 31 (e.g., FIG. 6(b)), and the second member 32 pivots about 90 degrees relative to the interposed member 33 (e.g., FIG. 8(b)), the door 20 swings about 180 degrees relative to the side wall 19 and is opened to the 180-degree opened position. The third and fourth contact portions 53 and 54 contact each other in the door opening side stopper 42 in FIG. 6(b), while the seventh and eighth contact portions 57 and 58 contact each other in the door opening side stopper 44 in FIG. 8(b).

(3) In the hinge 29, the portions (first to fourth contact portions 51 to 54) of the first stoppers 41 and 42 are arranged in the first member 31 and the interposed member 33, while the portions (fifth to eighth contact portions 55 to 58) of the second stoppers 43 and 44 are arranged in the second member 32 and the interposed member 33.

According to this cab 10 for a construction machine, since the interposed member 33 includes the contact portions (first to fourth contact portions 51 to 54) of the first stoppers 41 and 42, and the contact portions (fifth to eighth contact portion 55 to 58) of the second stoppers 43 and 44, the first member 31 and the second member 32 do not necessarily include the contact portions that contact each other.

(4) The hinge 29 is arranged at the position where the hinge 29 is located inward of or coplanar with the outer side surface of the side wall 19 when the door 20 is closed.

In more detail, the hinge is secured so that an imaginary surface of the outermost part of the hinge is located inward of or coplanar with the side wall of the cab and the outer side surface of the door so that the hinge may not protrude from the exterior surface of the cab when the door is closed.

According to this cab 10 for a construction machine, the hinge 29 does not protrude from the opening-side surface of the door 20 with the door 20 being closed. As a result, since the members of the hinge are not secured protruding from the outer surface of the cab, it is possible to avoid that the hinge structure causes problems that the cab does not meet transportation regulation and the like.

(5) The first pivot shaft 36 is arranged at the position corresponding to the width of the interposed member 33 from the end 19a of the side wall 19, while the second pivot shaft 37 is arranged on the end 20a of the door 20.

According to this cab of a construction machine, since the second pivot shaft 37 is arranged on the end 20a of the door 20, the end 20a of the door 20 does not protrude in the doorway of the cab 10 and does not reduce the width of the opening of the cab 10 when the door 20 is fully opened. In addition, since the first pivot shaft 36 is arranged at the position corresponding to the width of the interposed member 33 from the end 19a of the side wall 19, even if the width of the interposed member 33 is substantially reduced, an unnecessary clearance is not produced between the door 20 and the side wall 19.

(6) The shaft interferences of the first pivot shaft 36 and the second pivot shaft 37 are specified differently from each other so that the pivoting order of the first pivot shaft 36 and the second pivot shaft 37 is specified when the door 20 is opened/closed. According to this cab 10 for a construction machine, since the pivoting order of the first pivot shaft 36 and the second pivot shaft 37 is specified, the door 20 can be stably opened/closed.

Other Embodiments

The above description has described an exemplary embodiment according to the present invention. However, the present invention is not limited to the foregoing embodiment. Various changes and modifications can be made without departing from the spirit of the present invention.

(A) In the foregoing embodiment, the interposed member 33 has been illustratively described that is arranged along the outer surfaces of the stepping-into/off door 20 and the side wall 19. However, the present invention is not limited to this.

For example, the interposed member 33 may be arranged inward of the outer surfaces of the stepping-into/off door 20 and the side wall 19. Also, in this case, since it is possible further eliminate portions that protrude outward of the outer side surface of the cab 10 in hinge structure, it is possible to easily clear problems concerning transportation regulation and the like in transportation of the cab.

However, since it is preferable that the level difference do not appear in the hinge part from the viewpoint of outward appearance of the cab, it is more preferable that the interposed member 33 be arranged along the exterior surface of stepping-into/off door 20 or the like as is described in the foregoing embodiment.

(B) In the foregoing embodiment, as shown in FIGS. 5 to 8, as the example the stepping-into/off door 20 is opened/closed in stages, it has been illustratively described that the second pivot shaft 37 first pivots in the first stage, and then the first pivot shaft 36 pivots in the second stage. However, the present invention is not limited to this.

For example, as an example the stepping-into/off door 20 is opened/closed in stages, the first pivot shaft 36 may first pivot in the first stage, and then the second pivot shaft 37 may pivot in the second stage.

In addition, the first pivot shaft 36 and the second pivot shaft 37 may be constructed to simultaneously pivot, or to temporarily simultaneously pivot in the case where the first pivot shaft 36 and the second pivot shaft 37 have different pivot angles.

Although, in the foregoing embodiment, both the first and second pivot shafts have been illustratively described that pivot 90 degrees, the pivot angles of the first and second pivot shafts are not limited to this angle as long as the first and second pivot shafts pivot totally 180 degrees.

(C) In the foregoing embodiment, the hinge structure according to the present invention has been illustratively described to be adopted to the hinges 29 and 30 for opening/closing the stepping-into/off door 20 of the cab 10 installed on the hydraulic excavator 1. However, the present invention is not limited to this.

For example, the hinge structure according to the present invention may be adopted to the hinge for opening/closing the door of the cab installed on other construction machines such as crane truck, bulldozer, wheel loader, and motor grader.

In particular, it is preferable that the hinge structure according to the present invention be adopted to a cab installed on a construction machine that has a possibility that the operator operates the construction machine with the stepping-into/off door being fully opened the during operation such as hydraulic excavator as is described in the foregoing embodiment and crane truck.

(D) In the foregoing embodiment, the pin formed of a hard material has been used as a member for contacting the end of the bolt. However, the present invention is not limited to this. For example, in addition to the pin, a ball or other shape may be employed. Alternatively, a protrusion may be arranged in a part of the interposed member, and this protrusion may be subjected to surface treatments such as hard chrome plating.

Since a cab for a construction machine according to the illustrated embodiments has effects that a wide opening/closing angle of a hinge can be surely provided, and that the angle accuracy of the stopper can be sufficiently increased, the cab for a construction machine according to the illustrated embodiments can be widely applied to cabs for various types of construction machines.

The invention claimed is:

1. A cab for a construction machine comprising:
    a wall that surrounds an operator's seat, the wall having first cut-out portions that are formed on an outer side surface of the wall;
    a door that allows an operator to step into/off the cab, the door having second cut-out portions that are formed on an outer side surface of the door;
    hinges that swingably mount the door to the wall, with each of the hinges including a first member secured to the first cut-out portion of the wall, a second member secured to the second cut-out portion of the door, an interposed member interposed between the first and second members, a first pivot shaft pivotally coupling the first member and the interposed member to each other, and a second pivot shaft pivotally coupling the second member and the interposed member to each other, the hinges being attached at positions that are spaced at predetermined distances away from upper and lower ends of the door;
    a first stopper configured and arranged to regulate a pivot angle of the interposed member to a first angle with respect to the first member;
    a second stopper configured and arranged to regulate a pivot angle of the interposed member to a second angle with respect to the second member; and
    a bolt member arranged in the second stopper, and configured and arranged to move in an axial direction of the bolt member relative to the interposed member to adjust the second angle,
    an imaginary surface corresponding to an outermost part of each of the hinges is substantially coplanar with exterior surfaces of the wall and the door, when the door is closed.

2. The cab for a construction machine set forth in claim 1, wherein
    the first pivot shaft is arranged so that a distance between an attachment surface of the first member and an outer peripheral surface of the first pivot shaft substantially agrees with a depth of the first cut-out portion, and
    the second pivot shaft is arranged in proximity to an end surface of the door.

3. The cab for a construction machine set forth in claim 1, wherein
    a width of a coupling part of the interposed member agrees with a width of a gap between the door and the wall when the door is fully opened.

4. The cab for a construction machine set forth in claim 3, wherein
    the width of the coupling part of the interposed member falls within the range of 10 to 40 mm.

5. The cab for a construction machine set forth in claim 1, wherein
    the first angle is 90 degrees, and the second angle is 90 degrees.

6. The cab for a construction machine set forth in claim 1, wherein
    the first pivot shaft is arranged at a position corresponding to a width of the interposed member from an end of the wall, and
    the second pivot shaft is arranged on an end of the door.

* * * * *